US012793560B2

(12) United States Patent
Roper, Jr. et al.

(10) Patent No.: US 12,793,560 B2
(45) Date of Patent: Nov. 10, 2026

(54) MANAGEMENT SYSTEM FOR UNMANNED VEHICLES

(71) Applicant: Istari Digital, Inc., Charleston, SC (US)

(72) Inventors: William Roper, Jr., Charleston, SC (US); Christopher Benson, Charleston, NC (US); Long N. Phan, Charleston, SC (US); Paul A. DeBitetto, Concord, MA (US); James Dion, Malden, MA (US)

(73) Assignee: Primus Volatus LLC, Miami, FL (US)

( * ) Notice: Subject to any disclaimer, the term of this patent is extended or adjusted under 35 U.S.C. 154(b) by 560 days.

(21) Appl. No.: 17/902,625

(22) Filed: Sep. 2, 2022

(65) Prior Publication Data

US 2024/0078915 A1 Mar. 7, 2024

(51) Int. Cl.
*G08G 5/00* (2025.01)
*B64C 39/02* (2023.01)
(Continued)

(52) U.S. Cl.
CPC ............ *G08G 5/32* (2025.01); *B64C 39/024* (2013.01); *G08G 5/55* (2025.01); *G08G 5/57* (2025.01); *B64U 2201/10* (2023.01)

(58) Field of Classification Search
CPC .. G08G 5/0034; G08G 5/0069; G08G 5/0013; G08G 5/0026; G08G 5/0039;
(Continued)

(56) References Cited

U.S. PATENT DOCUMENTS 8,600,602 B1 * 12/2013 McAndrew .......... G05D 1/0038
244/76 R
9,613,535 B2 * 4/2017 Borri .................... G05D 1/0022
(Continued)

OTHER PUBLICATIONS

U.S. Appl. No. 16/398,481, Campbell et al..
(Continued)

*Primary Examiner* — Peter D Nolan
*Assistant Examiner* — Demetra R Smith-Stewart

(57) ABSTRACT

A system for managing missions for unmanned vehicles includes a computing interface and a flight management system. The computing interface is configured to communicate with at least one unmanned aerial vehicle (UAV) and a client device. The flight management system is in communication with the computing interface and includes one or more processors coupled to a memory. The flight management system is configured to receive mission parameters through the computing interface from the client device, the mission parameters being indicative of at least one action to be completed by the UAV during a flight of the UAV and one or more operational features of the UAV. The one or more operational features are a resource available to the UAV or a functional capability of the UAV for completing the at least one action. The flight management system is configured to generate a flight plan for the UAV, the flight plan including instructions for completing the at least one action by the UAV in accordance with the one or more operational features.

39 Claims, 11 Drawing Sheets

(51) Int. Cl.
*G08G 5/32* (2025.01)
*G08G 5/55* (2025.01)
*G08G 5/57* (2025.01)

(58) Field of Classification Search
CPC .... G08G 5/0043; G08G 5/006; B64C 39/024; B64U 2201/10; B64U 2101/30; B64U 2201/20
See application file for complete search history.

(56) References Cited

U.S. PATENT DOCUMENTS

| | | | | |
|---|---|---|---|---|
| 9,751,625 | B2 | 9/2017 | Phan et al. | |
| 10,198,011 | B2 | 2/2019 | DeBitetto et al. | |
| 10,291,764 | B2 * | 5/2019 | Dowlatkhah | H04W 12/08 |
| 11,482,117 | B2 * | 10/2022 | Sachs | G06Q 50/40 |
| 2015/0323931 | A1 * | 11/2015 | Downey | G05D 1/226 701/2 |
| 2016/0244187 | A1 * | 8/2016 | Byers | G06Q 10/0832 |
| 2017/0170972 | A1 * | 6/2017 | Wu | B64D 45/0051 |
| 2017/0259917 | A1 * | 9/2017 | Winn | B64U 50/19 |
| 2017/0278409 | A1 | 9/2017 | Johnson et al. | |
| 2018/0292826 | A1 * | 10/2018 | DeFelice | G05D 1/0094 |
| 2019/0088145 | A1 | 3/2019 | Chambers et al. | |
| 2019/0122567 | A1 * | 4/2019 | Evans | G08G 5/57 |
| 2021/0124376 | A1 * | 4/2021 | Edara | G06Q 10/063 |
| 2021/0125507 | A1 * | 4/2021 | Haider | G08G 5/0034 |
| 2022/0277654 | A1 | 9/2022 | Rezvani et al. | |
| 2022/0351628 | A1 * | 11/2022 | Ali | G06Q 10/06311 |

OTHER PUBLICATIONS

Global.rakuten.com [online], "Rakuten AirMap Launches Unmanned Traffic Management Platform for Japan," Dec. 7, 2017, retrieved on Aug. 30, 2022, retrieved from URL <https://global.rakuten.com/corp/news/press/2017/1207_01.html>, 3 pages.

Global.rakuten.com [online], "Rakuten and AirMap Announce Joint Venture to Bring Unmanned Traffic Management Platform to Japan," Mar. 15, 2017, retrieved on Aug. 30, 2022, retrieved from URL <https://global.rakuten.com/corp/news/press/2017/0315_01.html>, 3 pages.

Isa.org [online], "ISA88: Batch Control," Aug. 13, 2020, retieved on Aug. 30, 2022, retrieved from URL <https://www.isa.org/standards-and-publications/isa- standards/isa-standards-committees/isa88>, 3 pages.

Osborne et al., "Clarus: Concept of Operations," U.S. Department of Transportation Federal Highway Administration, Oct. 2005, Publication No. FHWA-JPO-05- 072, 130 pages.

International Search Report in International Appln. No. PCT/US2023/031833, mailed on Jan. 3, 2024, 17 pages.

* cited by examiner

900

MANAGEMENT SYSTEM FOR UNMANNED VEHICLES

TECHNICAL FIELD

This disclosure relates to a management system for unmanned vehicles. Specifically, the management system can be a flight management system for hybrid drones.

BACKGROUND

Unmanned vehicles can be configured to perform actions (such as execute missions). In some implementations, unmanned vehicles can require that several actions be taken by users or operators of the unmanned vehicles before the unmanned vehicles can execute their respective missions. For example, unmanned aerial vehicles (UAVs) may need to establish a flight plan that is validated by an operator (e.g., by taking factors such as range, fuel capacity, load, etc. into consideration). For example, once the flight plan is validated by the operator, it may need approval by an external organization, such as the Federal Aviation Administration (FAA).

SUMMARY

This document describes an unmanned vehicle management system for managing operations of unmanned vehicles. In implementations where the unmanned vehicle management system is used to manage operations of UAVs, the unmanned vehicle management system can sometimes be referred to also as a "flight management system." In implementations where the unmanned vehicle management system is used to manage operations of a fleet of vehicles, the unmanned vehicle management system can sometimes be referred to also as a "fleet management system." The unmanned vehicle management system can be configured to set up missions of unmanned vehicles. For example, the unmanned vehicle management system can validate a flight plan for a UAV. The unmanned vehicle management system can be used to generate a flight plan that can be exported to an external authority (e.g., the FAA or other such authority). The unmanned vehicle management system can manage the unmanned vehicles (such as UAVs or other unmanned vehicles) during operation of the unmanned vehicles. For example, the unmanned vehicle management system can be used to track UAV telemetry, manage path planning and traffic for one or more unmanned ground vehicles (UGVs), manage freighter traffic for seaborne vehicles, and so forth. The unmanned vehicle management system receives data (e.g., from an operator of the unmanned vehicle) prior to the mission to configure the mission (e.g., setting navigation waypoints, mission objectives, and so forth). The unmanned vehicle management system validates the mission to verify that the mission can be completed as configured by the operator. The unmanned vehicle management system generates the mission plan (e.g., a flight plan) into a format that can be authorized by an external authority, if appropriate.

The unmanned vehicle management system described herein can provide one or more of the following advantages. The unmanned vehicle management system enables increased efficiency for flight approvals. The flight management system handles planning and approvals from one or more appropriate agencies. The flight management system allows missions to be started (and therefore completed) faster. The flight management system includes a simulation environment which allows for less costly and time-intensive flight planning.

The flight management system enables increased integration between UAV missions relative to presently available systems. An operator can test planned missions, place mission requests, receive instructions and approvals, monitor mission progress/receive data, and operate multiple drones all on one secure platform. Missions can be planned, validated, and verified against hardware limitations of the particular UAVs being used but also against any requirements of external authorities that may restrict mission flight plans.

In one aspect, a system for managing missions for unmanned vehicles is featured. The system includes a computing interface configured to communicate with an unmanned aerial vehicle (UAV) and a client device. The system also includes a flight management system in communication with the computing interface, the flight management system including one or more processors coupled to a memory. The flight management system is configured to receive mission parameters through the computing interface from the client device, the mission parameters being indicative of at least one action to be completed by the UAV during a flight of the UAV and one or more operational features of the UAV. The one or more operational features are a resource available to the UAV or a functional capability of the UAV for completing the at least one action. The flight management system is configured to generate a flight plan for the UAV, the flight plan including instructions for completing the at least one action. The flight management system is also configured to generate a flight plan for the UAV, the flight plan including instructions for completing the at least one action by the UAV in accordance with the one or more operational features of the UAV.

Implementations can include the examples described below and herein elsewhere. In some implementations, the flight management system can be further configured to: configure the flight plan into a format specified by an external authority for validation by the external authority, transmit the flight plan in the format to the external authority, and receive a validation of the flight plan from the external authority, the validation indicative of approval to execute the flight plan. In some implementations, the computing interface can be configured to enable selection of the equipment for including with the UAV, and where mission parameters indicative of the one or more operational features are updated based on the selection of the equipment. In some implementations, the system can include a simulation environment configured to: receive the flight plan from the flight management system, simulate execution of the flight plan by the UAV based on the one or more operational features of the UAV, and verify, based on the simulating, that the UAV is capable of completing the flight plan. In some implementations, the one or more operational features can include at least one of a payload size for transporting by the UAV, an altitude limitation of the UAV, a speed limitation of the UAV, and an operational distance of the UAV. In some implementations, the one or more operational features can represent a specification of hardware sensors supported by the UAV. In some implementations, the computing interface can be configured to provide a security layer for accessing telemetry of the UAV, and the security layer can include at least one permission level for accessing the telemetry. In some implementations, the computing interface can be configured to receive telemetry from the UAV and send the telemetry to the client device for presentation on a user interface. In some implementations, the flight plan can include a specification of at least one operator from the operator database for monitoring the UAV during the flight of the UAV. In some implementations, the computing interface can be configured to grant a permission to a device of the at least one operator to operate the UAV during the flight of the UAV. In some implementations, the permission can be granted to the device of the at least one operator based on a certification and/or license associated with the at least one operator. In some implementations, the certification and/or license associated with the at least one operator can be obtained through an assessment of the at least one operator using a simulated environment. In some implementations, the flight management system can be further configured to generate the flight plan for the UAV based on a consideration of capabilities, characteristics, and/or locations of at least one other UAV configured to communicate with the computing interface.

In another aspect, a method for managing missions for unmanned vehicles is featured. The method includes receiving, at a flight management system and through a computing interface in communication with a client device, mission parameters indicative of at least one action to be completed by an unmanned aerial vehicle (UAV) during a flight of the UAV and one or more operational features of the UAV. The one or more operational features are a resource available to the UAV or a functional capability of the UAV for completing the at least one action. The method also includes generating a flight plan for the UAV, the flight plan including instructions for completing the at least one action by the UAV in accordance with the one or more operational features of the UAV.

Implementations can include the examples described below and herein elsewhere. In some implementations, the method can include configuring the flight plan into a format specified by an external authority for validation by the external authority; transmitting the flight plan in the format to the external authority; and receiving a validation of the flight plan from the external authority, the validation indicative of approval to execute the flight plan. In some implementations, the method can include storing, at a data store, data representing equipment that can be added to the UAV for completing the at least one action, enabling selection of the equipment for including with the UAV via the computing interface, and updating, based on the selection of the equipment, mission parameters indicative of the one or more operational features. In some implementations, the method can include receiving, at a simulation environment, the flight plan from the flight management system; simulating execution of the flight plan by the UAV based on the one or more operational features of the UAV; and verifying, based on the simulating, that the UAV is capable of completing the flight plan. In some implementations, the one or more operational features can include at least one of a payload size for transporting by the UAV, an altitude limitation of the UAV, a speed limitation of the UAV, and an operational distance of the UAV. In some implementations, the one or more operational features can represent a specification of hardware sensors supported by the UAV. In some implementations, the method can include providing an operator of the UAV selective access to telemetry of the UAV, wherein the selective access is based on a security layer provided by the computing interface. In some implementations, the method can include receiving, at the computing interface, telemetry from the UAV and sending the telemetry to the client device for presentation on a user interface. In some implementations, generating the flight plan for the UAV can include generating the flight plan to include a specification of at least one operator from an operator database for monitoring the UAV during the flight of the UAV. In some implementations, the method can include granting permission, via the computing interface, to a device of the at least one operator to operate the UAV during the flight of the UAV. In some implementations, granting the permission to the device of the at least one operator can be based on a certification and/or license associated with the operator. In some implementations, the certification and/or license associated with the at least one operator can be obtained through an assessment of the at least one operator using a simulated environment. In some implementations, generating the flight plan for the UAV can include generating the flight plan based on a consideration of capabilities, characteristics, and/or locations of at least one other UAV configured to communicate with the computing interface.

In another aspect, a non-transitory computer readable medium storing instructions that are executable by a processing device is featured. Upon such execution, the non-transitory computer readable medium causes the processing device to perform operations including receiving, at a flight management system and through a computing interface in communication with a client device, mission parameters indicative of at least one action to be completed by an unmanned aerial vehicle (UAV) during a flight of the UAV and one or more operational features of the UAV. The one or more operational features are a resource available to the UAV or a functional capability of the UAV for completing the at least one action. The operations also include generating a flight plan for the UAV, the flight plan including instructions for completing the at least one action by the UAV in accordance with the one or more operational features of the UAV.

Implementations can include the examples described below and herein elsewhere. In some implementations, the operations can include configuring the flight plan into a format specified by an external authority for validation by the external authority; transmitting the flight plan in the format to the external authority; and receiving a validation of the flight plan from the external authority, the validation indicative of approval to execute the flight plan. In some implementations, the operations can include storing, at a data store, data representing equipment that can be added to the UAV for completing the at least one action, enabling selection of the equipment for including with the UAV via the computing interface, and updating, based on the selection of the equipment, mission parameters indicative of the one or more operational features. In some implementations, the operations can include receiving, at a simulation environment, the flight plan from the flight management system; simulating execution of the flight plan by the UAV based on the one or more operational features of the UAV; and verifying, based on the simulating, that the UAV is capable of completing the flight plan. In some implementations, the one or more operational features can include at least one of a payload size for transporting by the UAV, an altitude limitation of the UAV, a speed limitation of the UAV, and an operational distance of the UAV. In some implementations, the one or more operational features can represent a specification of hardware sensors supported by the UAV. In some implementations, the operations can include providing an operator of the UAV selective access to telemetry of the UAV, wherein the selective access is based on a security layer provided by the computing interface. In some implementations, the operations can include receiving, at the computing interface, telemetry from the UAV and sending the telemetry to the client device for presentation on a user interface. In some implementations, generating the flight plan for the UAV can include generating the flight plan to include a specification of at least one operator from an operator database for monitoring the UAV during the flight of the UAV. In some implementations, the operations can include granting permission, via the computing interface, to a device of the at least one operator to operate the UAV during the flight of the UAV. In some implementations, granting the permission to the device of the at least one operator can be based on a certification and/or license associated with the operator. In some implementations, the certification and/or license associated with the at least one operator can be obtained through an assessment of the at least one operator using a simulated environment. In some implementations, generating the flight plan for the UAV can include generating the flight plan based on a consideration of capabilities, characteristics, and/or locations of at least one other UAV configured to communicate with the computing interface.

Other features and advantages of the description will become apparent from the following description, and from the claims. Unless otherwise defined, the technical and scientific terms used herein have the same meaning as commonly understood by one of ordinary skill in the art to which this invention belongs.

DETAILED DESCRIPTION

Described herein is an unmanned vehicle management system (also called a management system) for managing unmanned vehicle operations and missions. The management system enables configuration and execution of flight plans for UAVs, missions for UGVs, or missions for any other type of unmanned vehicle. The management system enables a user to configure a mission plan for an unmanned vehicle by setting one or more parameters of the mission plan. The management system can verify the mission plan as comporting with standards and/or regulations imposed by private entities and/or regulatory agencies. The management system can validate the mission plan (e.g., a flight plan) as complying with any limitations of a UAV, such as flight time, altitude restrictions, payload restrictions, and so forth.

Figure 1A:
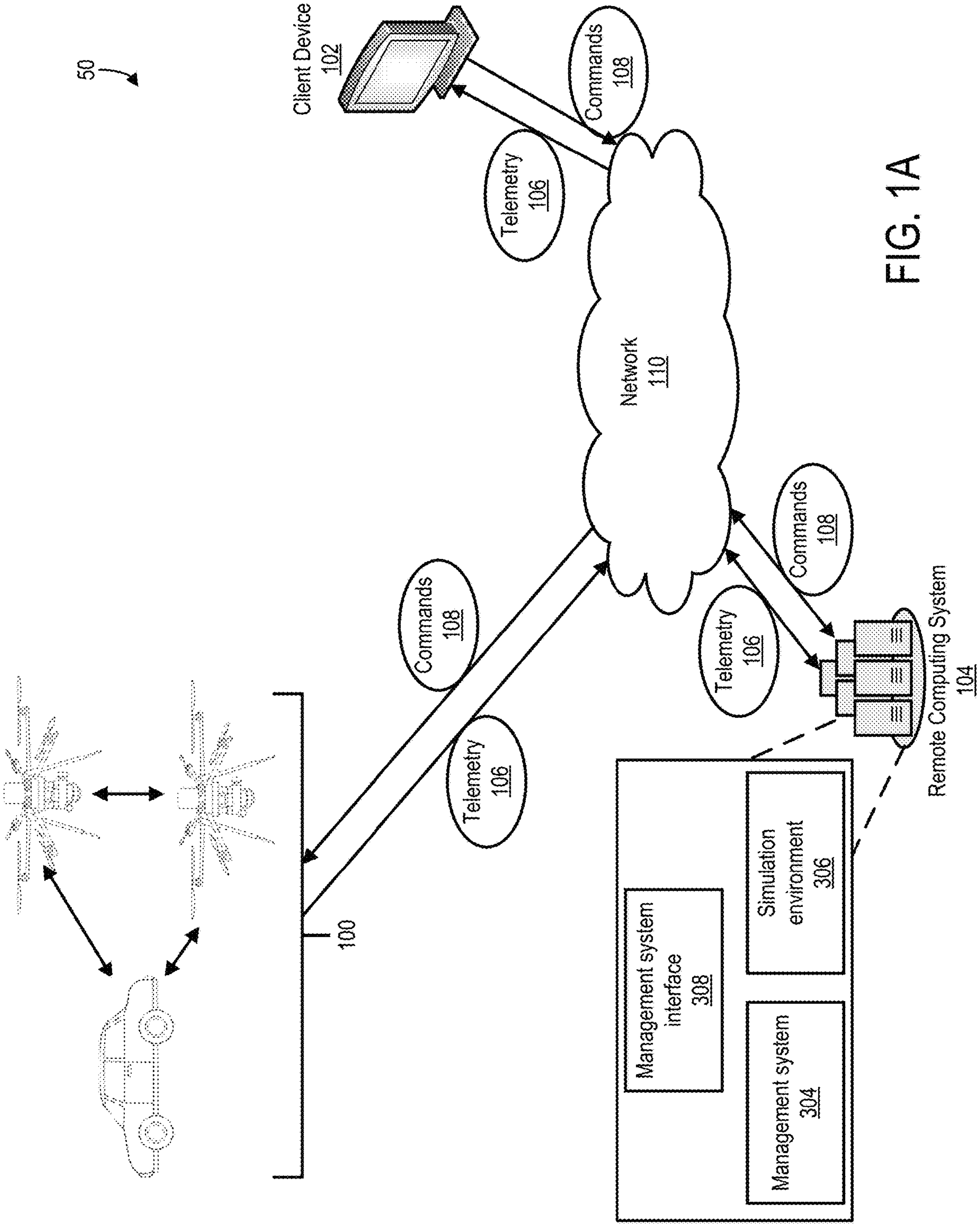
FIG. 1A shows an example computing environment of an unmanned vehicle management system.

FIG. 1A shows an environment 50 in which a management system 304 (e.g., a flight management system) operates. The environment 50 includes one or more unmanned vehicles 100, a client device 102, and a remote computing system 104. The unmanned vehicles 100, client device 102, and the remote computing system 104 communicate over a network 110.

The remote computing system 104 includes one or more computing systems hosting the management system 304 and a simulation environment 306. The term "management system" generally refers to an application configured to be executed by the remote computing system 104. However, in this document, it is understood that when the management system 304 is referred to as performing an action such as sending data, receiving data, presenting data, etc., it is the remote computing system 104 or a portion thereof that is being instructed to perform the respective action. In some aspects, the computing system 104 includes a cloud computing system.

The management system 304 enables configuration and execution of mission plans for unmanned vehicles 100, such as via the client device 102. For example, the management system 304 can control the remote computing system 104 to provide a remote connection to one or more of the unmanned vehicles 100. The management system 304 can provide security, authentication and/or management permissions for data sent to and/or received from an unmanned vehicle 100. The management system 304 can enable access to current and historical data from one or more unmanned vehicles by users of the management system 304. The management system 304 can provide an interface (e.g., management system interface 308) to plan and configure high-level unmanned vehicle mission actions without requiring manual configuration of all of the lower-level details and/or parameters of the entire mission plan. Generally, high-level unmanned vehicle mission actions include general objectives to be accomplished by the unmanned vehicle 100 during the mission rather than specific commands used to achieve those objectives. For example, high-level mission actions can include defining waypoint lists, path planning, mission start and end locations, payload pickup or delivery locations, and so forth. The management system 304 can provide an operator override capability (e.g., in case of emergency). The management system 304 can enable a user to manage remote connection to one or more unmanned vehicles 100 and related support equipment of the one or more unmanned vehicles using long-range telemetry (e.g., using 4G LTE or 5G New Radio networks). The management system 304 can arbitrate equipment ownership and control among multiple users and computing systems (when applicable). The management system 304 can collect and store telemetry data from one or more unmanned vehicles 100 and related support equipment of the one or more unmanned vehicles. The management system 304 can manage Maintenance Repair Operations (MROs) and issue work orders based on usage-based preventative maintenance schedules. The management system 304 can plan missions (e.g., UAV flight plans) based on parameters set by the user. The management system 304 can integrate with Unmanned Traffic Management (UTM) authorities and/or other regulatory entities. The management system 304 can manage automated and operator-driven tasks and pre-flight checks. The management system can check one or more certifications of an operator or otherwise validate an operator's authorization to operate a particular UAV, execute a particular mission, and/or access particular data. In some implementations, the management system 304 can be a flight management system (FMS).

Each of the one or more unmanned vehicles 100 can be any suitable type of unmanned vehicle. For example, the unmanned vehicle can be a ground vehicle, a UAV, a ship, a car, a truck (e.g., a semi-truck, etc.), and so forth. The UAVs 100 can be replicas of one another (e.g., including identical hardware and software), or one or more of the UAVs can be unique. Generally, the hardware properties of the UAVs 100 are registered in the management system 304 when the UAV is managed by the management system.

The client device 102 can be configured to initiate mission execution based on internal and external clearance, relative to the management system 304. The client device 102 can provide an interface for post-flight review of data, such as access to the management system interface 308. The data can be presented in varying levels of granularity in the interface 308. For example, the interface 308 can provide data from high-level mission actions, which can include objectives identified pre-flight or during flight, either automatically or manually. For example, the interface 308 can provide a detailed subsystem analysis and subsystem summaries for a detailed review of a subsystem of the unmanned vehicle 100. The management system 304 maintains historical records for one or more of the unmanned vehicles 100 that are connected to the management system, e.g., for purposes of data analysis for an entire fleet. For example, the management system 304 can maintain and/or determine statistics for unmanned vehicles 100 in the fleet, which can be used, e.g., to identify operational irregularities, fleet trends (e.g., expected flight operational time vs. realized flight operational time for a UAV type), or other features of the fleet. In some implementations, fleet-wide statistical data are used to identify operational irregularities and/or predict possible unmanned vehicle 100 failure(s) and generate associated warning alerts to the fleet operator. The functionality of the management system 304 is described in further detail, below.

The management system 304 can be paired with a simulation environment 306. The simulation environment can be used by the management system 304 during the verification and validation of the mission plan. The simulation environment 306 enables unmanned vehicle operators (e.g., UAV operators) to train using portions of the actual hardware (such as control systems), software, and avionics systems of real autonomous systems, reducing time to achieve an appropriate level of proficiency for safe operation. The simulation environment 306 enables concurrent simulation of multiple UAVs in realistic environments, e.g., high-fidelity, photo-realistic environments, to teach operators how to safely operate in real world settings, such as highly congested settings. The simulation environment 306 includes real-world location models, such as models of infrastructure, terrain, and/or dynamic weather conditions that allow for training in the environment where missions will be performed. In the example of UAVs as unmanned vehicles 100, the UAV models of the simulation environment 306 are developed using as-built physical and aerodynamic properties of flight vehicles. This enables operators to train with realistic flight characteristics prior to operating a real vehicle. In some implementations, the simulation environment 306 not only enables operators to train, but can be used to certify operators to operate particular UAVs and/or execute missions having particular characteristics (e.g., weather conditions, geographic locations, time of day, number and type of UAVs involved, etc.). The certification process can be designed to satisfy the standards of one or more regulatory authorities. Certifying operators using the simulation environment 306 can have advantages such as decreased costs, faster certification, reduced risk of damage to UAV hardware, the ability to rapidly simulate various mission characteristics, more reliable metrics of operator performance, better standardization of certification tests, etc.

The remote computing system 104 includes a remote computing system configured to be in communication with the unmanned vehicle 100 and the client device 102 over the network 110. The remote computing system 104 includes one or more networked computing devices configured to provide off-loaded processing and storage of data related to operation of the unmanned vehicle 100. In some implementations, the unmanned vehicle 100 is in communication with the remote computing system 104 during operation using high-bandwidth communications to permit telemetry 106 to be transmitted to the cloud for real-time or near real-time use in unmanned vehicle operations. In some implementations, telemetry 106 that the unmanned vehicle 100 collects and transmits over the network 110 can be stored at the cloud (e.g., remote computing system 104) and/or distributed to other computing systems (such as the client device 102). In some implementations, some computations for operation of the unmanned vehicle 100 are performed at the remote computing system 104, such as autonomous navigation or semi-autonomous navigation. The interface 308 is presented at a client device 102 as an application, web portal, etc. as described in further detail below with respect to FIG. 3.

In some implementations, the remote computing system 104 does not actually perform the computations of the management system 304 or the simulation environment 306. Rather, these are done instead on the client device 102. In this case, the client device 102 serves as a user portal including an interface 308 of the management system 304 and/or simulation environment 306.

Figure 1B:
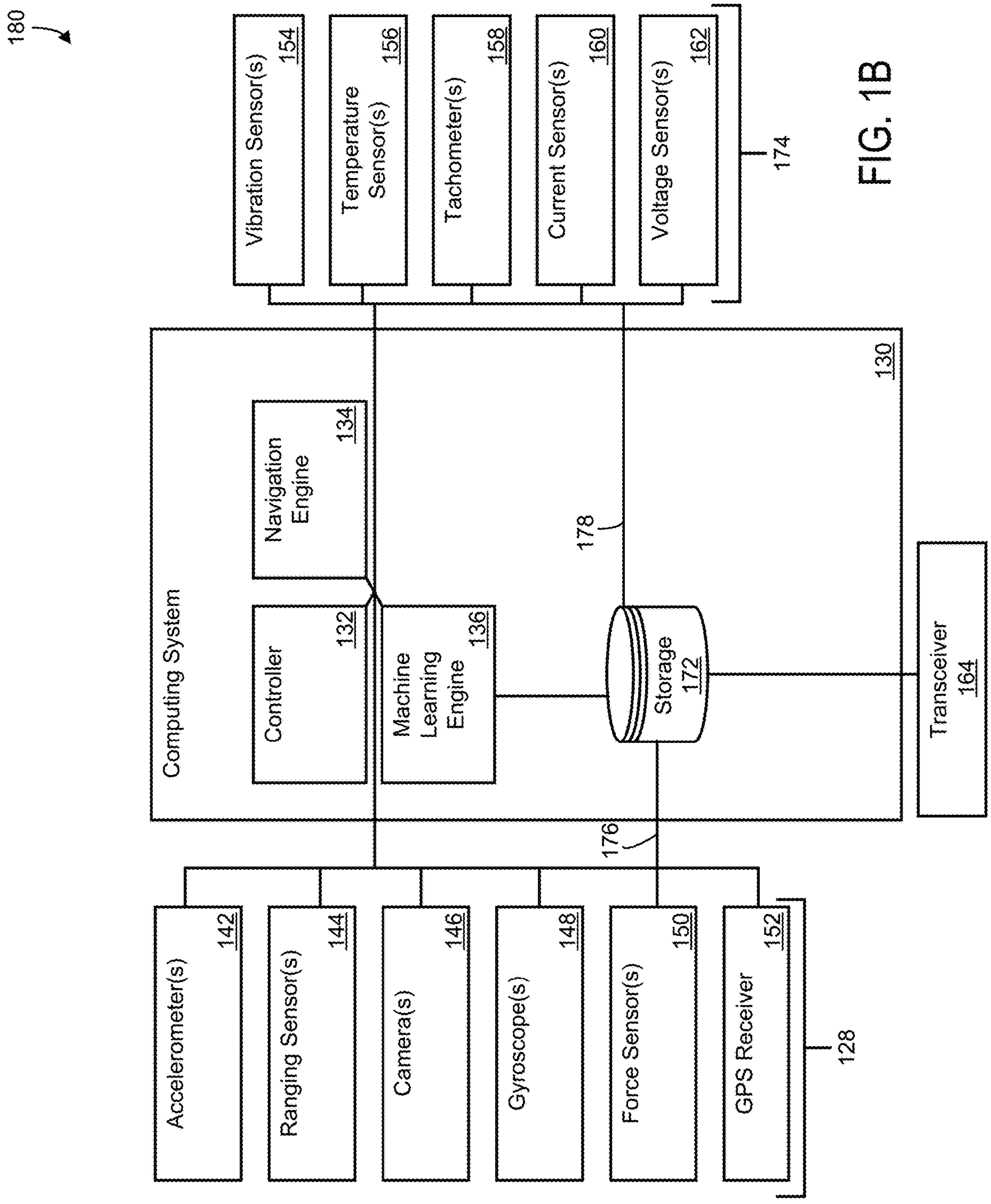
FIG. 1B shows an example of an unmanned aerial vehicle of the computing environment of FIG. 1A.

Turning to FIG. 1B, an example UAV 180 system for interfacing with the management system 304 is shown. UAV 180 can be one of the unmanned vehicles 100. In some implementations, an unmanned vehicle 100 can include a portion of the functionality of UAV 180. Here, UAV 180 is shown to illustrate the functionality that can be managed by the management system 304, but this is not an exhaustive list of possible functionality of a UAV 100 that can be managed by the management system 304.

UAV 180 includes a computing system 130 which is configured to autonomously navigate the UAV. The computing system 130 is electronically coupled to a sensor package for collecting data about the environment of the UAV 180. For example, the sensor package includes navigational sensors 128, such as the accelerometer(s) 142, ranging sensor(s) 144, camera(s) 146, gyroscope(s) 148, force sensor(s) 150, Global Positioning System (GPS) receiver 152, and other navigational sensors 128.

The data provided by the sensors 128 can include operational parameters such as local and global position data (e.g., for local and global maps of the UAV, respectively); time data; pitch, roll, and yaw data; load data (e.g., the weight of a payload transported by the UAV); images of the environment of the UAV; motion data such as acceleration or velocity of the UAV; ranging of the UAV to features of the environment of the UAV; time stamps of when each value of an operational parameter was measured; and so forth.

The collected data can be used for path selection and navigation. One or more types of sensing techniques may be employed by the computing system; for example, passive and/or active techniques may be used. For example, passive optical, thermal, etc., sensor technology may be used. Similarly, radar, LiDAR, etc. systems that transmit incident signals and collect reflected signals may be employed by the navigation system. The computing system 130 includes one or more logic engines configured to process environmental data received from the sensor package of the UAV 180 and/or data stored in a storage (e.g., storage 172) of the UAV.

The sensor package of the UAV 180 is configured to gather data about an environment of the UAV 180. The data gathered can be used by the computing system 130, e.g., to determine the location of the UAV 180 in the environment or to plan a path for the UAV 180 through the environment. For example, the computing system 130 can be configured to recognize a navigation landmark for localization. In some implementations, the sensor package includes many discrete sensors. In some implementations, one or more of the sensors included in the sensor package may be positioned inside of the housing of the UAV 180 and/or one or more of the sensors may be positioned outside of the housing of the UAV 180, e.g., depending on the design and/or function of the sensor.

During operation of the UAV 180 (e.g., during navigation), sensors of the UAV measure values of one or more operational parameters (also called parameters or sensor data), which are included in the telemetry 106. Operational parameters include one or more of GPS data, local and global vehicle positions, vehicle heading, vehicle velocity, system voltage, and so forth. A list of example operating parameters and corresponding example source update rates is included below in Table 1.

TABLE 1

List of example operating parameters and refresh rates

| Operating Parameter | Source Update Rate (Hz) |
|---|---|
| Telemetry Heartbeat | 1 |
| Flight Computer System Status | 1 |
| Vehicle Raw GPS Data | 1 |
| Vehicle Attitude | 50 |
| Vehicle Local Position | 50 |
| Vehicle Global Position | 50 |
| Vehicle Velocity | 50 |
| Vehicle Mission Waypoint | 10 |
| Vehicle Ground Speed | 10 |
| Vehicle Heading | 10 |
| Vehicle Propulsion Throttle | 10 |
| Vehicle Altitude AMSL | 1 |
| Vehicle Altitude AGL | 1 |
| Flight System Voltage | 1 |
| Flight System Output Current | 1 |
| ECU System Voltage | 10 |
| ECU Output Current | 10 |
| ECU Left Cylinder Head Temperature | 10 |
| ECU Right Cylinder Head Temperature | 10 |
| ECU Generator Temperature | 10 |
| ECU Rectifier Temperature | 10 |
| ECU Left Cooling Fan Output | 10 |
| ECU Left Cooling Fan Current | 10 |
| ECU Right Cooling Fan Output | 10 |
| ECU Right Cooling Fan Current | 10 |
| ECU Engine RPM | 10 |
| ECU Battery Charge Current | 10 |

The plurality of sensors of the UAV 180 include navigational sensors 128. The navigational sensors can include one or more accelerometers 142, one or more ranging sensors 144 (e.g., LiDAR, LaDAR, etc.), one or more cameras 146, one or more rotation sensors 148 (e.g., gyroscopes), one or more force sensors 150 (e.g., strain sensors), a Global Positioning System (GPS) position receiver 152, and/or a transceiver 164.

The navigational sensors 128 provide data to the computing system 130 to assist the computing system 130 of the UAV 180 in conducting navigation from a first location to a second location (or other operations of the UAV). The accelerometers 142 provide acceleration data. The ranging sensors 144 provide data indicating range from the UAV 180 to one or more objects in the environment of the UAV. For example, the ranging sensors can provide range to obstacles, other UAVs, etc. to assist the UAV in path-planning and navigation. The cameras 146 can provide still image data and/or video image data of the environment of the UAV 180. Image processing can be performed by the computing system 130 to extract features from the images captured by the cameras 146 to navigate the UAV. The gyroscope 158 provides pitch, roll, and/or yaw data to the computing system 130 to assist in navigation and/or flight control. The force sensor(s) 150 provides data indicating a payload weight that is being carried by the UAV 180, which can impact fuel use, operational range, top speed, turn radius, and other navigation aspects. The GPS receiver 152 can provide GPS coordinates for use in global and/or local maps of the UAV during navigation. In some implementations, the GPS receiver 152 provides the position of the UAV 180 in the GPS coordinate system, e.g., when the UAV 180 is instructed to navigate to a series of GPS waypoints. The transceiver 164 is configured to send data to and receive data from remote computing systems, such as the computing system 104 and the client device 102, e.g., over network 110. In some implementations, the transceiver 164 includes a high-bandwidth system for outsourcing some real-time operations of navigation (or UAV simulation) to the remote computing system 104. For example, the transceiver 164 can include a serial radio. The transceiver is configured to send telemetry 106 and receive commands 108 over the network 110. The transceiver 164 is electronically connected to the computing system 130 so that data from a data storage 172 of the UAV can be transmitted by the transceiver 164.

The values of navigation operational parameters (also called navigation data 176) provided by the navigation sensors 128 of the UAV 180 can be stored locally in a storage 172 of the UAV. The navigation data 176 can be stored at different security levels, as described further below. The level of security of the navigation data 176 can determine whether the navigation data are transmitted as telemetry 106 or whether the data are secured locally on the UAV 180.

The UAV 180 can include status sensors 174 for monitoring the status or operations of each of one or more elements of the UAV 180. For example, the UAV 180 includes an energy generation system that can include a hybrid generator. As described below, the hybrid generator can include one or more batteries, an engine, and electronics for converting energy from the engine (e.g., a combustion engine, a turbine, etc.) and for charging the one or more batteries. The status sensors 174 are configured to monitor the hybrid generator or other energy system of the UAV 180. For example, the status sensors 174 can include vibration sensors 154, temperature sensors 156, tachometers 158, electronic current sensors 160, and/or voltage sensors 162. The status sensors 174 can include one or more sensors to monitor other operational parameters of the UAV 180, e.g., related to the position of the UAV and/or the hardware systems of the UAV. For example, the status sensors 174 can include one or more of the navigational sensors 128 (e.g., a gyroscope 148, an accelerometer 142, a force sensor 150, etc.). The status sensors 174 provide data that can be indicative of characteristics of the UAV operation, such as whether the UAV is flying on course, is level and/or stable, that the payload or planned navigation route does not exceed operational capacity of the power system, or other characteristics.

The status sensors 174 monitor the values of various operational parameters during operation of the UAV 180. For example, the vibration sensors 154 can monitor vibrations to enable determination (e.g., by the computing system 130) of whether an engine of the UAV 180 is causing vibrations over a threshold level that might be deemed safe and/or stable for further operation of the UAV. For example, several operational parameters of an Engine Control Unit (e.g., ECU 212 described in relation to FIG. 2) can be monitored. The temperature sensors 156 monitor temperatures of one or more UAV 180 systems, such as heat sink temperatures, electronic rectifier heat, processor heat of the computing system, engine cylinder head temperatures (if applicable), and so forth. The tachometers 158, which can include shaft encoders, can monitor the rotations per minute (RPM) of various systems of the UAV including engine RPM (if applicable), cooling fan RPM, propeller RPM, etc. The current sensors 160 monitor a battery charge current (e.g., for a hybrid generator, how much the batteries are being charged by the engine), battery output current, output currents of one or more ports of the computing system 130, output current of the ECU, and so forth. The voltage sensors 162 monitor a charge or voltage of the one or more batteries (e.g., of a hybrid generator or of a fully electric power system), a system voltage of the computing system 130, a voltage of the ECU, and so forth. The measured values of the status operational parameters (also called status data 178 or status values) are sent to the computing system 130 of the UAV 180. The status data 178 are stored locally on the UAV 180 in storage 172. In some implementations, the status data 178 are stored with a different security level than the navigation data 176, as described in further detail below. The status data 178 can be selectively transmitted as telemetry 106 to a remote computing system 104 or to an authorized user. In some implementations, portions of the status data 178 or all of the status data are never transmitted as telemetry 106.

The navigation engine 134 is configured to execute logic for navigating the UAV 180 through an environment. The navigation engine 134 receives data from the sensors 128, 174 and, in some implementations, data from the machine learning engine 136 in order to determine what path the UAV 180 should follow. For example, the navigation engine 134 may receive data from the camera 146 indicative of a feature of the environment to which the UAV is instructed to navigate. The machine learning engine 136 can receive the data from the camera 146 and extract the feature from the image or otherwise determine that the feature is present in the image. The machine learning engine 136 and camera 146 send data to the navigation engine, which determines that there are no obstacles between the UAV 180 and the feature, and thus plans a path toward the feature. The navigation engine 134 passes data representing the desired heading to the controller 132, which converts this data to motor commands for one or more rotors of the UAV 180. This is a simplified example, but it illustrates the relative responsibilities of the machine learning engine 136, controller 132, and navigation engine 134 for operating the UAV 180. The navigation engine 134 can receive data from any one of the sensors 128, 174 and/or from storage 172 for navigating the UAV 180 through the environment. In some implementations, the UAV 180 can navigate by extracting features from the environment across multiple spectra (magnetic, thermal, visible light, etc.), as further described in U.S. application Ser. No. 16/029,383, and incorporated by reference herein in its entirety.

As indicated in FIG. 1A, multiple unmanned vehicles 100 can be interfaced with the client device 102. The unmanned vehicles 100 are configured to communicate with one another for cooperative execution of one or more tasks. The unmanned vehicles 100 can operate as a swarm. In some implementations, the unmanned vehicles 100 can form a mesh network. In some implementations, the unmanned vehicles 100 can distribute tasks of a mission and work in parallel to accomplish the mission. Tasks can be assigned to one or more unmanned vehicles 100 via the management system 304 manually or automatically. The unmanned vehicles 100 need not each be identical or approximately identical copies, but can include unmanned vehicles of various operating capabilities. For example, the UAV 180 of FIG. 1B is a representative unmanned vehicle 100 for illustrative purposes, but unmanned vehicles 100 can include other similar functionality that is not shown in FIG. 1B. For example, each unmanned vehicle 100 can include specialty sensors or other hardware and/or software for performing particular tasks. For example, an unmanned vehicle 100 need not include a rotor and propeller. However, the management system 304 is configured to manage and/or monitor the rotors, propellers, etc. of unmanned vehicles 100. Additionally, the unmanned vehicle 100 need not include a hybrid generator 200, but the management system is configured to manage and/or monitor such a hybrid generator.

The management system 304 can be used to identify a particular UAV that is suited for a task in a mission and automatically assign the respective UAV to perform that task. For example, the management system 304 can identify UAVs 100 that are capable of transporting particular payloads over minimum distances, and select and/or suggest such a UAV of the swarm for transporting said payload. For example, the management system 304 might send an alert to an operator of the client device 102 indicating that a particular UAV being assigned to a task is not capable of lifting an assigned payload. The operator can then select another available UAV from a list to perform the respective mission of transporting that payload. In another example, the management system 304 can consider the capabilities, characteristics, and locations of multiple UAVs in the same fleet when assigning and/or identifying UAVs to perform tasks. For example, given a fleet of UAVs that includes individual UAVs in various locations, the management system 304 can assign and/or identify a particular UAV to a task to reduce or minimize an estimated total amount of fuel usage used across the fleet. The capability of the management system 304 in managing tasks and assigning and/or identifying UAVs of a fleet to perform those tasks is described further with respect to FIGS. 3-4, below.

Figure 2:
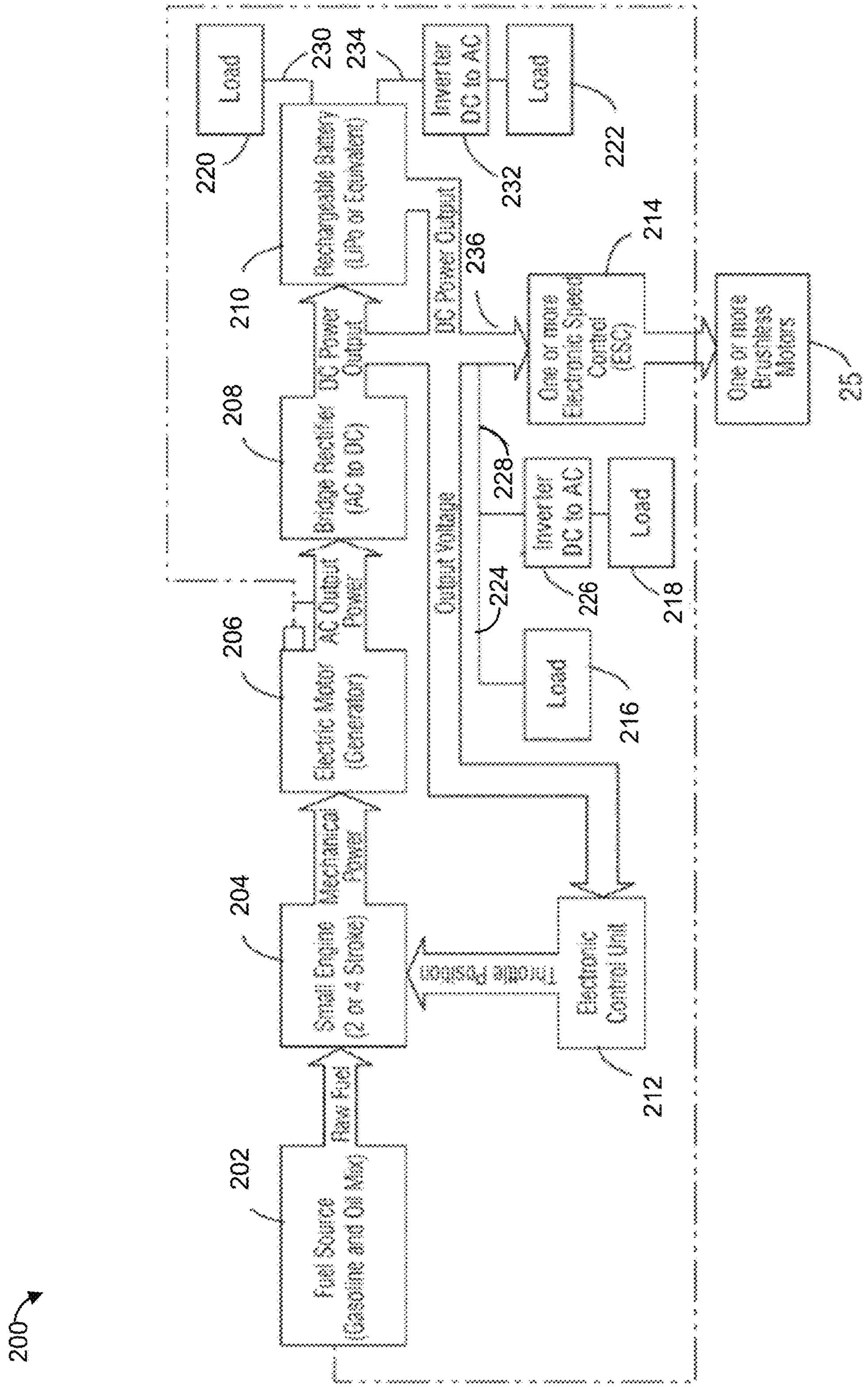
FIG. 2 depicts a diagram of an example hybrid generator system implemented in the unmanned aerial vehicle of FIG. 1B.

FIG. 2 depicts a diagram of an example hybrid generator system 200, such as of the UAV 180 of FIG. 1B. The hybrid generator system 200 includes a fuel source 202, e.g., a vessel for storing gasoline, a mixture of gasoline and oil mixture, or a similar type of fuel or mixture. The fuel source 202 provides fuel to an engine 204, of a first power system. The engine 204 can use the fuel provided by the fuel source 202 to generate mechanical energy. In one example, the engine 204 can have dimensions of about 12" by 11" by 6" and a weight of about 3.5 lbs. to allow for integration in a UAV 180. In one example, the engine 204 may be an HWC/Zenoah G29 RCE 3D Extreme available from Zenoah, 1-9 Minamidai Kawagoe, Saitama 350-1165, Japan.

The hybrid generator system 10 also includes a generator motor 206 coupled to the engine 204. The generator motor 206 functions to generate AC output power using mechanical power generated by the engine 204. In various embodiments, a shaft of the engine 204 includes a fan that dissipates heat away from the engine 204. In various embodiments, the generator motor 206 is coupled to the engine 204 through a polyurethane coupling.

In one embodiment, the hybrid generator system 200 can provide 1.8 kW of power. Further in the embodiment, the hybrid generator system 200 can include the engine 204 that provides approximately 3 horsepower and weighs approximately 1.5 kg, e.g. a Zenoah® G29RC Extreme engine. In the embodiment, the hybrid generator system 200 includes a generator motor 206 that is a brushless motor, 380 Kv, 8 mm shaft, part number 5035-380, available from Scorpion Precision Industry®. In another embodiment, the hybrid generator system 200 can provide 10 kW of power. Further in the another embodiment, the hybrid generator system 200 can include the engine 204 that provides approximately between 15-16.5 horsepower and weighs approximately 7 pounds, e.g. a Desert Aircraft® DA-150. In another embodiment, the hybrid generator system 200 includes a generator motor 206 that is a Joby Motors® JM 1 motor.

The hybrid generator system 200 includes a bridge rectifier 208 and a rechargeable battery 210. The bridge rectifier 208 is coupled between the generator motor 206 and the rechargeable battery 210 and converts the AC output of the generator motor 206 to DC power to charge the rechargeable battery 210 or provide DC power to load 216 by line 224 or power to DC-to-AC inverter 226 by line 228 to provide AC power to load 218. The rechargeable battery 210 may provide DC power to load 220 by line 230 or to DC-to-AC inverter 232 by line 234 to provide AC power to load 222. In one example, an output of the bridge rectifier 208 and/or the rechargeable battery 210 of hybrid generator system 200 is provided by line 236 to one or more electronic speed control devices (ESC) 214 integrated in one or more rotor motors 25 as part of an UAV. The ESC 214 can control the DC power provided by bridge rectifier 208 and/or rechargeable battery 210 to one or more rotor motors. In one example, the ESC 214 can be a T-Motor® ESC 45A (2-6S) with SimonK. In one example, the bridge rectifier 208 can be a model #MSD I00-08, diode bridge 800V IOOA SM3, available from Microsemi Power Products Group®.

In various embodiments, the ESC 214 can control an amount of power provided to one or more rotor motors 25 in response to input received from an operator. For example, if an operator provides input to move a UAV to the right, then the ESC 214 can provide less power to rotor motors 25 on the right of the UAV to cause the rotor motors to spin propellers on the right side of the UAV slower than propellers on the left side of the UAV. As power is provided at varying levels to one or more rotor motors 25, a load, e.g. an amount of power provided to the one or more rotor motors 25, can change in response to input received from an operator.

In one embodiment, the rechargeable battery 210 may be a LiPo battery, providing 3000 mAh, 22.2V 65C, Model PLU65-30006, available from Pulse Ultra Lipo®, China. In other designs, the rechargeable battery 210 may be a lithium sulfur (LiSu) rechargeable battery or similar type of rechargeable battery.

The hybrid generator system 200 includes an electronic control unit (ECU) 212. The ECU 212, and other applicable systems described in this paper, can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, Ethernet interface, satellite transmission interface (e.g. "direct PC"), or other interfaces for coupling a computer system to other computer systems. Interfaces enable computer systems and other devices to be coupled together in a network.

A computer system can be implemented as a module, as part of a module, or through multiple modules. As used in this paper, a module includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the module's functionality, or the like. As such, a first module and a second module can have one or more dedicated processors, or a first module and a second module can share one or more processors with one another or other modules. Depending upon implementation-specific or other considerations, a module can be centralized or its functionality distributed. A module can include hardware, firmware, or software embodied in a computer-readable medium for execution by the processor. The processor transforms data into new data using implemented data structures and methods.

The ECU 212 is coupled to the bridge rectifier 208 and the rechargeable battery 210. The ECU 212 can be configured to measure the AC voltage of the output of the generator motor 206, which is directly proportional to the revolutions per minute (RPM) of the engine 204, and compares it to the DC power output of the bridge rectifier 208. The ECU 212 can control the throttle of the engine 204 to cause the DC power output of the bridge rectifier 208 to increase or decrease as the load changes, e.g., a load of one or more electric motors 25 or one or more of loads 216, 218, 220, and 222. In one example, the ECU 212 can be an Arduino® MEGA 2560 Board R3. In various embodiments, a load of one or more electric motors 25 can change as the ESC 214 changes an amount of power provided to the electric motors 25. For example, if a user inputs to increase the power provided to the electric motors 25 subsequently causing the ESC 214 to provide more power to the electric motors 25, then the ECU 212 can increase the throttle of the engine 204 to cause the production of more power to provide to the electronic motors 25.

The ECU 212 can function to maintain voltage output of loads by reading the sensed analog voltage, converting these to ADC counts, comparing the count to that corresponding to a desired voltage, and increasing or decreasing the throttle of the engine 204 according to the programmed gain if the result is outside of the dead band.

In one example, the hybrid generator system 200 can provide about 1,800 watts of continuous power, 10,000 watts of instantaneous power (e.g., 6S with 16,000 mAh pulse battery) and has a 1,500 Wh/kg gasoline conversion rate. In one example, the hybrid generator system 200 has dimensions of about 12" by 12" by 12" and a weight of about 8 lbs.

In some examples, the materials of the hybrid generator system and/or the UAV itself can be lightweight, such as materials with a high strength-to-weight ratio. Example materials can include aluminum or high strength aluminum alloys (e.g., 7075 alloy), carbon fiber based materials, or other materials. In some examples, components can be designed to reduce the amount of material used for the components, e.g., by designing the components to have increased stiffness or by removing material that is not relevant for the functioning of a component.

Further description of UAVs and hybrid generator systems can be found in U.S. Pat. No. 9,751,625, the contents of which are incorporated here by reference in their entirety.

Figure 3:
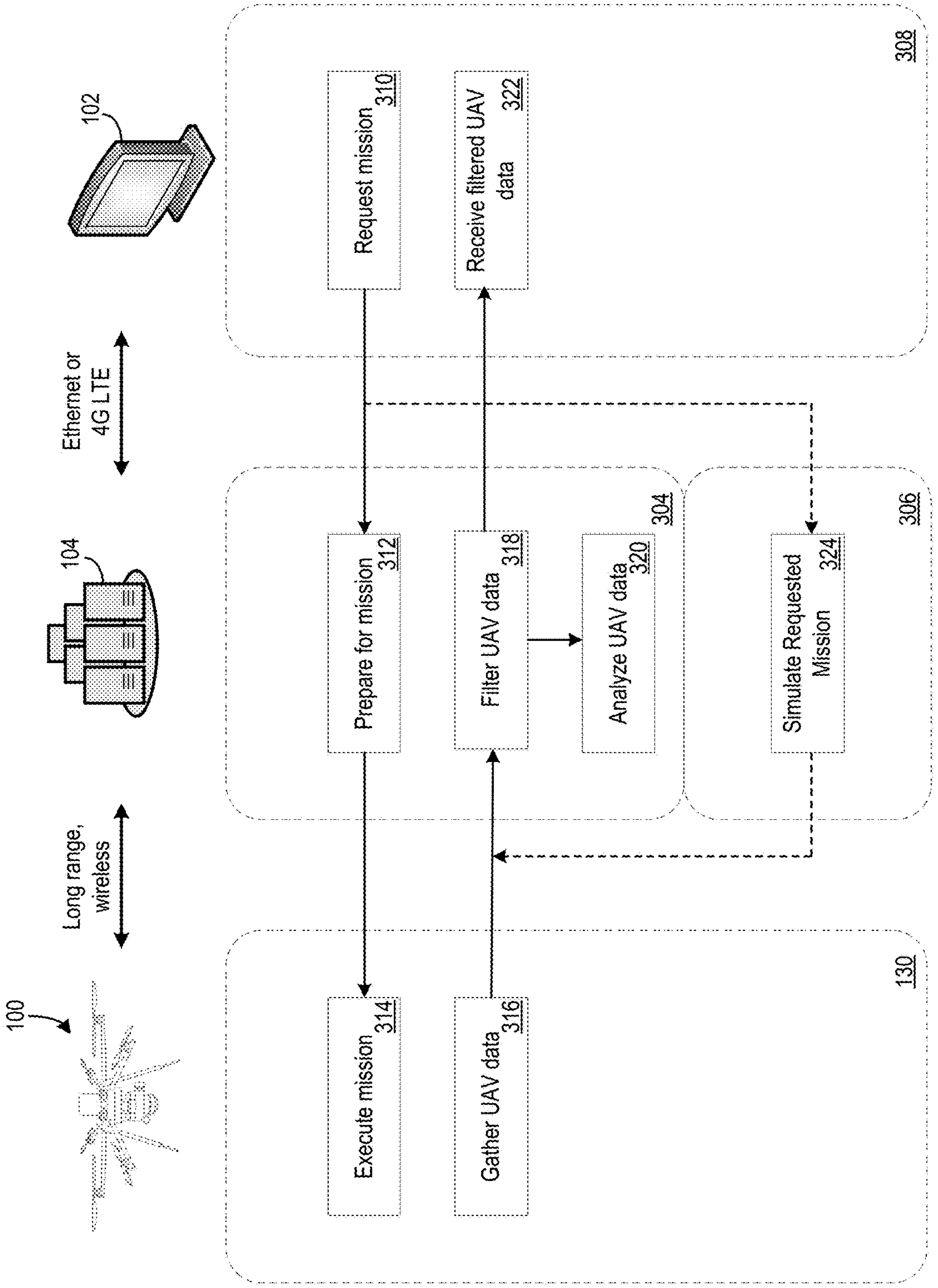
FIG. 3 is a flow chart showing data flow between a customer portal, a management system, and unmanned vehicle equipment.

Turning to FIG. 3, the management system 304 monitors one or more components of the UAV 100 (e.g., including a hybrid generator system of the UAV) and controls their operation to provide efficient operation for execution of missions. As described above in relation to FIG. 1*i*, the management system 304 receives telemetry 106 that includes status data 178 from the status sensors 174. The telemetry 106 can include some or all of the data of Table 1, above, and can be refreshed at the frequencies shown or at other frequencies as appropriate. For example, the UAV 100 may transmit a subset of the data of Table 1 to the management system 304 unless an operator of the management system has special clearances to access additional data. For example, a first operator may have access to a base set of data from the UAV 100, while a second operator may have access to a second, more comprehensive set of data from the UAV 100 at faster refresh rates.

In some implementations, an anomaly can be detected in the status data 178 and/or navigational data 176. For example, the UAV 100 can detect, based on the status data 178, that the hybrid generator system 200 is malfunctioning, that a mission parameter cannot be completed (e.g., target is out of range based on detected fuel reserves, etc.), and/or that some problem is occurring with the UAV 100. The UAV 100 can then transmit in the telemetry 106 an alert to the management system 304 indicating that the mission has a problem. In some implementations, the alert can be accompanied by the status data 178 and/or navigational data 176 associated with the anomaly, which can provide additional context to the management system 304 regarding the anomaly. In some implementations, the UAV 100 transmits the status data 178 and/or the navigational data 176 to the management system 304, and the client device 102 determines that an anomaly is occurring for that respective UAV 100. In response to receiving an alert, the management system 304 can report the anomaly to an operator of the management system 304 using any kind of alarm, notification, etc. that brings the operator's attention to the anomaly. For example, in a list of operating UAVs in an interface of the management system 304 (e.g., interface 308), critical errors can be shown by changing the color of a listed UAV to red, while non-critical errors can be shown by changing the color of a listed UAV to yellow. Text, symbols, and sounds can accompany the alert. Examples of the graphical user interface (GUI) of the management system 304 are described below in greater detail with respect to FIG. 7A and FIG. 7B.

FIG. 3 is a diagram showing data flow between the management system interface 308 (also interface 308), the management system 304, the simulation environment 306, and UAV 100 equipment. The interface 308 includes a customer portal (e.g., an application, web portal, etc.) accessible by a manager of one or more of the unmanned vehicles 100 via the client device 102. In some implementations, the interface 308 logic is executed on the client device 102 as an application. In some implementations, the interface 308 logic can be executed on the remote computing device 104 and presented at the client device through the portal (e.g., as interface 416 subsequently described in reference to FIG. 4).

As stated above, the client device 102 can include any of a desktop computing device, laptop, tablet, etc. The interface 308 is displayed as a user interface to the operator of the management system 304. The operator can interact with the management system 304 by the interface in order to manage one or more unmanned vehicles 100, as described below. The management system 304 and simulation environment 306 are typically hosted in a cloud-based computing system (e.g., remote computing system 104), but as described above in relation to FIG. 1A, the client device 102 can also host at least portions of the management system 304 and simulation environment 306.

To initiate operation of an unmanned vehicle 100, a user submits (310) a mission request. The mission request can be submitted to the management system 304 (e.g., communicating via Ethernet/4G LTE). The mission request includes all relevant parameters for the mission to be executed by the unmanned vehicle 100. For example, the mission request can include one or more of payload information, flight time of day and date, flight duration, waypoint locations, start and ending positions, path plans or planned routes (e.g., part of a drone highway system), number of unmanned vehicles 100 being used, unmanned vehicle communication configurations, and so forth.

In some implementations, the mission request can be configured by an operator using drop-down menus, radio buttons, etc. If required data are not entered, the management system 304 can prevent the mission from being scheduled until the remaining data are received. The management system 304 can prompt the operator for missing mission request data.

The interface 308 can be customized by a user depending on what kinds of missions are generally requested by that operator. An operator profile can pre-populate mission requests with default mission parameters that have been defined by the operator. The result enables streamlined, standardized mission requests to be submitted to the management system 306 for scheduling missions.

The interface 308 includes an application programming interface (API). The interface is thus a user-facing API that handles all operator requests and integrates with a mission execution system (MES) and operator interface (described in further detail, below) of the management system 304. The interface provides a link from the computing system 104 and/or the client device 102 to unmanned vehicles 100. The interface 308 can be a public and managed API. The interface 308 can include a security layer between the public internet and a private backend system.

Operators can be authenticated and given permissions based on an access level, certifications, and/or licenses associated with the operator. As stated above, the permissions may include access to additional operating parameters of the unmanned vehicle 100 (e.g., status data 178 of UAV 180). The permissions may enable additional mission parameters to be specified if the operator has clearance. For example, the operator may be permitted to schedule unmanned vehicle 100 operation over particular airspace, at particular times of the day, or to perform particular functions that are restricted to operators without that clearance. For example, an operator can establish that he has a license (e.g., a government license, etc.) to operate unmanned vehicles 100 in a particular way. In response, the management system 304 can allow additional options to that operator for managing one or more unmanned vehicles 100. Operators are thus permitted to schedule only unmanned vehicle 100 missions that conform to their license and/or industry standards (if applicable). In some implementations, the operator's license can be obtained through an assessment of the operator in the simulation environment 306, as previously described.

The management system 304 receives the mission request data from the interface 308 and prepares (312) the mission for the UAV. The management system 304 prepares the UAV 100 to execute the mission by validating all mission request parameters and verifying nominal operation of the unmanned vehicle 100 systems. The management system 304 includes multiple modules, which are each described in relation to FIG. 4. The modules are configured for executing different portions of mission control, preparation, and execution.

The management system 304 prepares for the mission specified by the mission request. For example, the management system 304 runs unmanned vehicle 100 diagnostics, plans a flight route, seeks and obtains approval from any necessary authorities (e.g., government authorities), instructs the operator for the preparation of mission and selects an operation plan for the unmanned vehicle 100.

Figure 4:
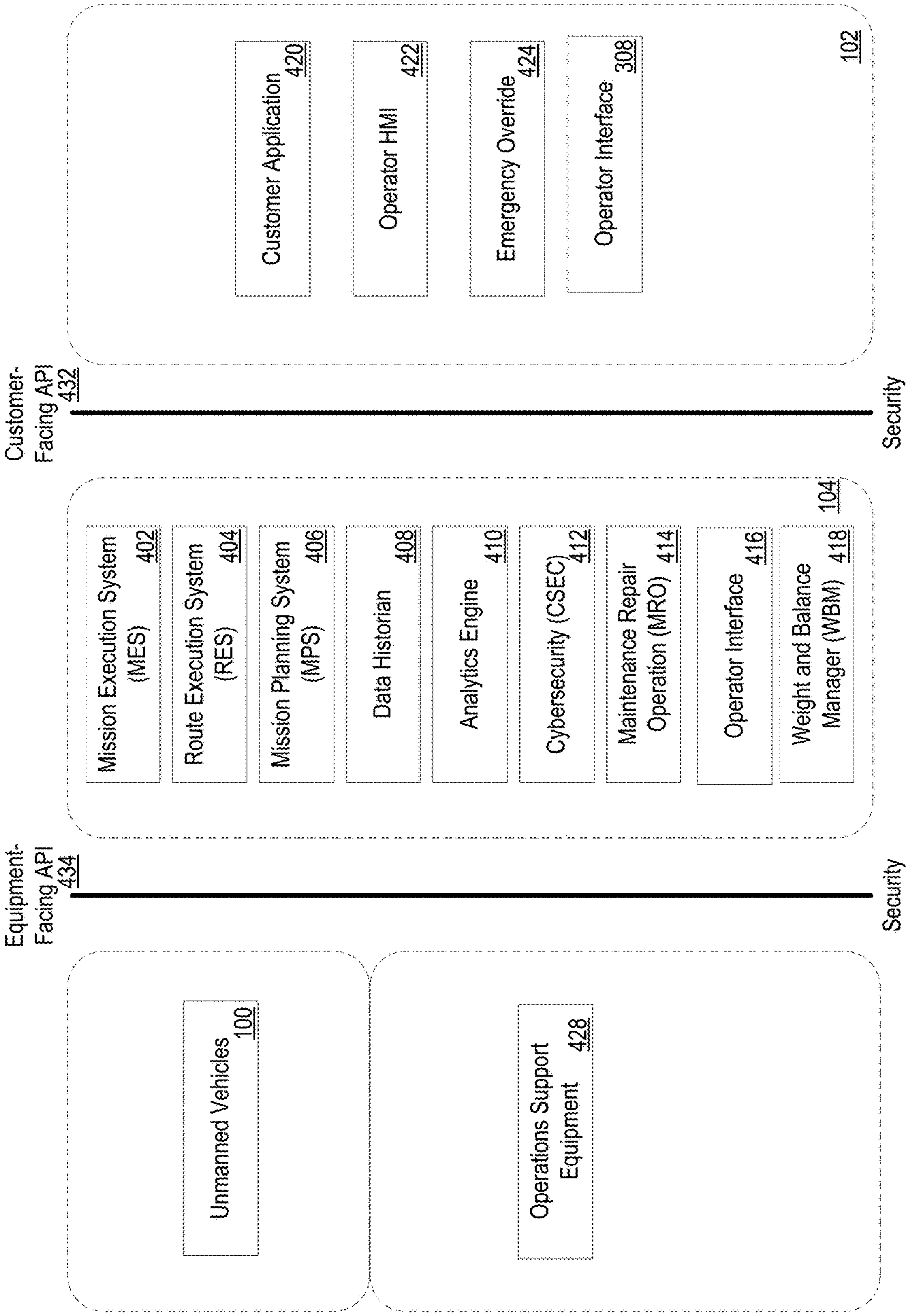
FIG. 4 is a schematic of modules included in the customer portal, the management system, and the unmanned aerial vehicle equipment of FIG. 3.

In some implementations, mission preparation includes simulating (324) the requested mission in the simulation environment 306 (described in detail with respect to FIG. 4). Simulation data are sent to the management system 304, and in some cases, to the operator at the interface 308. The management system 304 uses the simulation data to verify and/or validate a pre-scheduled mission, and cause the mission to be scheduled for execution. Here, verification includes a determination that the operator has permission to execute the mission. Validation includes a determination that the mission is feasible, safe, and conforms to any restrictions indicated by a user's license or by other authorities. In some implementations, the simulation data may indicate that the mission fails verification and/or validation, requiring revision of the mission by the operator and postponing scheduling of the mission. The simulation can be performed by the operator prior to generating the mission request or can be performed by the management system 304 on behalf of the operator in response to the management system 304 receiving the mission plan.

Once a mission has been verified and validated (optionally through simulation), the management system 304 generates the mission plan. The mission plan includes commands 108 for performing the mission in accordance with the mission request. The flight plan can be sent to the UAV 100 all at once, and additional commands can be sent continuously (e.g., during the mission). As such, autonomous, semi-autonomous, or manual control of the unmanned vehicle 100 is permitted as specified by the flight plan. The management system 304 sends the flight plan to the unmanned vehicle 100 for initiating the execution of the mission. The management system 304 communicates wirelessly with the UAV 100 over up to long distances (e.g., hundreds of miles or more) and receives unmanned vehicle data back in approximately real time. The unmanned vehicle 100 executes (314) the mission as indicated by the mission plan. The unmanned vehicle 100 gathers (316) data (e.g., status data 178 and/or navigation data 176) and transmits at least a portion of the data as telemetry 106 back to the management system 304.

The management system 304 interfaces with customer and unmanned vehicle 100 while the unmanned vehicle is completing the mission. The management system 304 receives telemetry 106 from unmanned vehicle 100, filters (318) and analyzes (320) the telemetry, and sends at least a subset of the telemetry to the interface 308 for use by the operator, including any alerts that may have been generated that indicate an anomaly (or other event) during the mission. The interface 308 receives (322) the filtered (and/or analyzed) telemetry 106 and presents the data to the operator.

FIG. 4 is a schematic of modules included in the interface 308, the management system 304 and simulation environment 306, and the unmanned vehicles 100 and associated unmanned vehicle operations support equipment 428.

The management system 304 and simulation environment 306 include several modules configured for communicating with customer and equipment and for preparing and executing missions. The management system 304 can include APIs for interfacing with the interface 308 and the unmanned vehicles 100 and associated operations support equipment 428. As described above, the management system 304 and simulation environment 306 can be hosted on the computing system 104 (e.g., a cloud-based computing system), as shown in FIG. 4. In some implementations, the management system 304 and simulation environment 306 can be hosted on a client device 102.

The modules of the management system 304 can include a customer-facing API 432, configured to connect to the interface 308 operated on the client device 102. The customer-facing API 432 configures the interface 308 for customer interaction with management system 304. The interface 308 can include an application and/or a web-based program. The customer-facing API 432 can require a user to be registered to access the management system 304. The customer-facing API 432 grants permissions to operators on a case-by-case basis, such as based on job function and training level of a particular operator. In some implementations, the training level of the particular operator can be tested and validated using the simulation environment 306. The customer-facing API 432 provides a security layer between the public internet (e.g., network 110) and the private backend network. The customer-facing API 432 provides access to a mission execution system 402 (MES) of the management system 304 for configuring missions of the UAVs 100 as described below. The permission level granted may restrict the operator's ability to access certain features of the MES 402, to access particular data of the unmanned vehicles 100 (such as status data 178), or to execute certain mission types and/or send certain mission commands to the UAVs during execution of a mission.

The management system 304 includes an equipment-facing API 434. The equipment-facing API 434 is the primary interface for field equipment to interact with the management system 304. The equipment-facing API 434 provides a secure connection for telemetry 106 from equipment 428 to be provided to the management system 304, such as to a mission planning system 406 (MPS) (e.g., also called a flight planning system FPS), a route execution system 404 (also called a flight execution system FES), and/or to a data historian 408, as described below.

The management system 304 includes a mission execution system 402 (MES). The mission execution system 402 is configured to maintain a comprehensive equipment database, and an operator database. The operator database stores a list of operators and operator actions for those operators. In some implementations, the operator database can also store one or more certifications and/or licenses held by each operator. The equipment database includes operations support equipment 428 status (e.g., equipment status) and a history of all operations performed on the equipment 428. The mission execution system 402 executes a mission record. The mission record includes a list of automatically generated tasks based on the mission request received from an operator. The mission record is generated by the mission execution system 402 to support preflight, flight, and post flight operations. Each of these operations interact to form a successful mission. The tasks included in the mission record can be implemented in the management system 304 or unmanned vehicle 100 controllers 130, or may require actions to be completed by an operator at the interface 308.

The management system 304 includes a route execution system 404 (RES) (also called a flight execution system FES). The route execution system 404 includes a primary means for other applications to interact with an unmanned vehicle 100. For example, an operator or an automated application can gain control of an unmanned vehicle 100 through an arbitration procedure. Once the arbitration system assigns ownership of unmanned vehicle 100 or equipment 428 to an application or an operator, no other application or operator may take control of that unmanned vehicle 100 or its operations support equipment 428. Once ownership is assigned, an application or operator may initiate a control procedure, which can involve one or multiple various subsystems of the unmanned vehicle 100. The flight execution system 404 functions as a mission executive that controls a loading of flight plan parameters to the unmanned vehicle 100 and/or equipment 428 and the flow of all procedural events related to the equipment and/or unmanned vehicle.

The management system 304 includes a mission planning system 406 (MPS) (also called a flight planning system FPS). The mission planning system 406 includes an application through which mission parameters are developed. For example, the mission planning system 406 transforms a list of mission objectives into an actual mission plan (e.g., a flight plan). For example, the mission plan can include parameters specifying waypoints, altitude, precision landing location, emergency landing procedures, and so forth. The mission plan is developed based on the data provided by the operator, the type of vehicle being used, weather information, unmanned aircraft system traffic management (UTM) clearances, information from the weight and balance manager 418, and one or more simulations from the simulation environment 306.

The management system 304 includes a data historian 408. The data historian 408 includes a database comprising an immutable collection of data from all unmanned vehicles 100 and associated equipment 428. For example, data from each actuator or computing system 130 of each unmanned vehicle 100 is broken into individual data points and time stamped. In some implementations, the data historian 408 can time stamp buffered data received post flight using the equipment 428 time instead. Each individual data point includes an associated security setting that limits which class of operator or application may access (e.g., view, change, etc.) the data point. In some implementations, each data point is configured to support the type of data being supplied such that the data type, units, collection rate and data compression methods can be set appropriately by the management system 304. The data historian 408 allows access to the mission execution system 402, the maintenance repair operation 414 (MRO), the operator interface 308, the mission planning system 406, the mission execution system 402, the analytics engine 410, and select customer applications 420. The data historian 408 is configured to collect data from simulated missions of the simulation environment 306.

The management system 304 includes an analytics engine 410. The analytics engine 410 uses raw data from the data historian 408 to provide insight to higher level statistics of unmanned vehicle 100 data. In this way, the analytics engine 410 is an extension of the data historian 408. For example, a total flight time for an unmanned vehicle 100 can be calculated using altitude data and throttle data, and the flight time can be reported to the operator or otherwise used by the flight planning system 406 for flight validation and verification (described above). In some implementations, the analytics engine 410 generates a batch of summary data based on receiving a query. The query can be configured by an operator and can be based on a set of triggers. The triggers can be created based on changes in the data, such as a parameter exceeding a particular threshold in value or in time, etc. A batch of data includes all of the sensor data or derived data for a subset of data points which occurred during the trigger period. Batching data facilitates viewing pertinent data to a mission operation by an operator.

The management system 304 includes a cyber-security and electronic countermeasures (CSEC) engine 412. The CSEC engine 412 is configured to detect security threats, such as to hijack or disable a flight. The CSEC engine 412 can include one or more machine learning engines that are trained to determine what flight anomalies and what data being received by the UAV may indicate a cyberattack is underway.

When the CSEC engine 412 detects a threat, the CSEC engine logs the threat, initiates monitoring of the attacker in a virtual machine, and determines the goal(s) of attacker based on available data. The virtual machine includes a simulated clone of the unmanned vehicle 100 being attacked. The simulated clone allows the cyberattack to proceed, misleading the attacker to believe that the attack is successful. The CSEC engine 412 thus protects the attacked unmanned vehicle 100 and allows the management system 304 system extra time to recognize and catalog methods to attack to further improve security and possibly identify the attacker. Such systems and methods are detailed further in U.S. application Ser. No. 16/398,481, filed Apr. 30, 2019, which is incorporated herein in entirety by reference.

The management system 304 includes a maintenance and repair operation (MRO) engine 414. The MRO engine 414 manages preventative maintenance and repair work required for unmanned vehicles 100. The MRO engine 414 receives data from the data historian 408. The MRO engine 414 uses the data to update usage metrics for individual components, which can each have preventative maintenance schedules. In some implementations, work orders are automatically requested based on preventative maintenance schedules and equipment status can be updated, such as to show offline until maintenance is performed. In some implementations, an operator can interact with the MRO engine 414 by the operator interface 308 to initiate work requests (e.g., if the operator determines that there is equipment damage by visual inspection or some other means). The mission execution system 404 queries the MRO engine 414 to verify that scheduled unmanned vehicles 100 and equipment 428 are ready for use before executing a mission.

The management system 304 includes the operator interface 416. The operator interface 416 is accessible from the customer facing API, and a graphical user interface 308 can be presented at the client device 102 (e.g., generated by logic of the interface 416). Logic of the operator interface 416 can be included on the computing system 104 or at the client device 102. The interface 308 allows operators to view data for unmanned vehicles 100 or other equipment 428. The interface 308 is configured to provide an equipment system view, a flight heads-up display (HUD), and/or work order view. System permissions can be controlled based on privilege level of operator's account, and different data and/or data configurations are presented to the operator, accordingly. The interface 308 is configured to respond differently to different users. For example, an operator submitting a single mission for operation is shown different options compared to an operator managing multiple missions through the fleet management system or compared to a regulatory agency overseeing all flights in airspace.

The management system 304 includes a weight and balance management (WBM) engine 418. The WBM engine 418 ensures that an unmanned vehicle 100 is capable of performing a particular mission by verifying (e.g., with scale integration) whether duration(s) of the flight(s) can be achieved with the required payload and fuel requirements. The WBM engine 418 is used for flight planning by the flight planning system 406 and can reject mission requests from an operator that are not feasible or undesirable (e.g., unacceptably inefficient). The WBM engine 418 is configured to maintain a model of a vehicle endurance profile for an unmanned vehicle 100 for all phases of flight which can be used to calculate the fuel burn throughout the mission. In some implementations, the required fuel load and reserve fuel load are calculated by the WBM engine 418. After a flight, the data historian 408 feeds actual fuel consumption and other flight data back into the model to improve the prediction for the next flight.

An operator can interact with the interface 308 by a customer application 420. The application 420 allows the operator to input mission requirements. For example, the mission requirements can include a date, a deadline, payload data, a type of mission, start and endpoints for flight, and so forth. The application can also allow input of a suggested mission plan which can be automatically adjusted by the mission planning system 406 if appropriate.

The operator human-machine interface (HMI) 422 includes the physical interface for the operator. The interface 308 presents data on the HMI 422 for mission monitoring and logging and instructions from the management system 304 for preparing for and completing a mission. Examples of the operator interface are shown below in FIGS. 7A, 7B, and 8.

An emergency override 424 is provided to the operator. The emergency override is configured to allow an operator to abort a mission and/or take control of the unmanned vehicle 100 immediately. In some implementations, the emergency override requires special authentication for the express purpose of emergency override.

As stated above with respect to FIG. 1B, the unmanned vehicles 100 execute missions and collect data via on board sensors. The operations support equipment 428 includes scales, flow meters, precision loading equipment, printers, and any other equipment that remotely connects to the management system 304.

Figure 5:
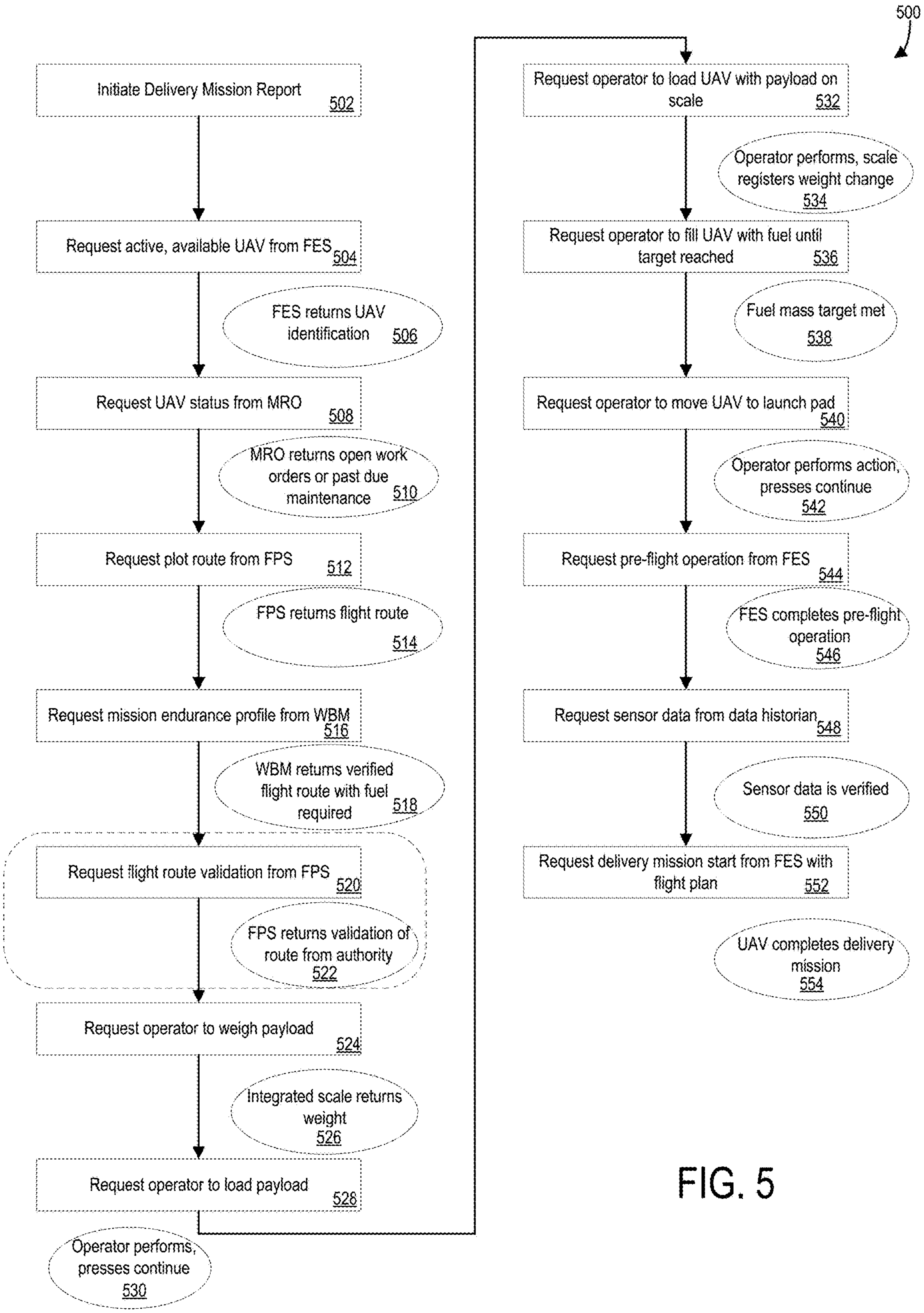
FIG. 5 is a flow chart showing a process for completing a mission executed by the mission execution system of the management system of FIG. 4.

FIG. 5 includes a flow chart showing a process 500 for completing a mission executed by the mission execution system 402 of the management system 304 of FIG. 4. For example, process 500 can include a customer submitting a mission request to the management system 304 to operate a single mission of an unmanned vehicle 100. In FIG. 5, steps in solid boxes are performed by the mission execution system 402, while steps outside of the boxes are performed by other modules of the management system 304. The dashed box includes authentication steps. The authentication steps include interactions with one or more external agencies. The authentication steps are described in detail in relation to FIG. 6.

The mission execution system 402 initiates (502) a delivery mission report. The mission report includes the mission request and flight plan parameters from the operator. The mission execution system 402 requests (504) an unmanned vehicle 100 (or plurality of unmanned vehicles) from a pool of available hardware. The route execution system 404 (also called a flight execution system [FES]) selects one or more unmanned vehicles 100 as appropriate and returns (506) unmanned vehicle identifiers indicating which UAV(s) are selected to perform the mission in the mission report.

The mission execution system 402 requests (508) the status of the selected unmanned vehicle 100 from the maintenance and repair operation engine 414. The maintenance and repair operation engine 414 replies (510) with any open work orders that are pending and/or past due maintenance notifications. Alternatively, the MRO engine 414 can reply that all unmanned vehicle 100 systems are ready for flight. In some implementations, an operator can override any alerts for maintenance or open work orders. The ability to override this check can depend on a permissions level of the operator. In some implementations, some maintenance alerts cannot be overridden (e.g., alerts for flight critical systems, such as the hybrid generator system), while other alerts can be ignored (e.g., alerts for non-critical systems, such as environmental sensors, etc.).

After maintenance checks have been passed, the mission execution system 402 requests (512) a path plan (e.g., route plot) from the mission planning system 406. The mission planning system 406 plots the route and returns (514) the planned mission path (e.g., flight path). As stated above, the planned path can take all data known about the mission and location of the mission into account, such as UAV traffic, no-fly zones, requested waypoints, etc. The mission plan can be enhanced by performing one or more simulations in the simulation environment 306.

Once the path has been planned by the mission planning system 406, the mission execution system 402 requests (516) a mission endurance profile from the WBM 418. The WBM 418 verifies (518) the flight path by determining the range of the UAV 100 based on one or more of the requested payload, payload capacity, etc. and determines how much fuel is required. The WBM 418 thus confirms that the selected unmanned vehicle 100 is capable of completing the mission planned by the mission planning system 406. Once the mission plan is finalized from a technical standpoint, the mission execution system 402 requests (520) route validation (e.g., flight route validation) from an external authority (such as a government agency). The external authority receives the mission plan (e.g., a flight plan for UAV 180) and confirms that the mission plan is acceptable under the rules of the external authority. For example, the external authority may require that the operator has a license, or may otherwise restrict unmanned vehicle 100 flight paths or flight time in some way. The mission plan is comprehensive and is provided to the external authority in a format that enables the external authority to make a determination of whether the external authority will authorize the unmanned vehicle 100 mission. In some implementations, the format can be specified by the authority. In some implementations, the flight plan can be submitted to a plurality of external authorities if appropriate, in whatever formats the external authorities each require. Once approved, the mission planning system 406 returns (522) data indicating that the external authority has validated the mission plan. This verification process is described further in relation to FIG. 6.

The mission execution system 402 sends (524) a request that the operator weigh the payload. In response, the operator can weigh the payload on a scale (e.g., an integrated scale). In some implementations, the integrated scale can return (526) the measured weight to the mission execution system 402. In some implementations, the operator can manually enter or send a value indicative of the weight to the mission execution system 402.

The mission execution system 402 sends (528) a request that the operator load the selected unmanned vehicle 100 with the payload. Once the payload has been loaded, the operator confirms (530) as much by pressing a button or by some similar means. In some implementations, the mission execution system 402 requests (532) that the operator place the loaded unmanned vehicle 100 on a scale, which reports (534) the total weight of the unmanned vehicle and payload to the operator and to the mission execution system 402. The mission execution system 402 indicates (536) to the operator how much fuel should be loaded into the unmanned vehicle 100. Once the fuel mass target is met (538) the mission execution system 402 requests (540) that the operator move the unmanned vehicle 100 to the launch pad to begin the mission.

The mission execution system 402 detects (542) that the unmanned vehicle 100 is placed on the launch pad, typically in response to an operator indicating as much through the interface 308 or by some similar means. The mission execution system 402 requests (544) pre-flight operations be performed by the flight execution system 404. These operations can include starting up the unmanned vehicle 100 and monitoring systems for a final pre-flight or pre-mission check to ensure that systems are operating nominally. Once pre-flight operations are completed (546) by the flight execution system 404, the mission execution system 402 requests (548) sensor data from the data historian 408. Such a request is used to verify that the unmanned vehicle 100 is operating correctly. Once the sensor data are verified (550), which can be performed by the analytics engine 410, the mission execution system 402 requests (552) that the mission execution system 404 begin the mission in accordance with the mission plan. The unmanned vehicle 100 operates in accordance with the mission plan, until the mission is completed (554). In this example, once the payload is delivered, the unmanned vehicle 100 returns to the base and the mission is completed.

Figure 6:
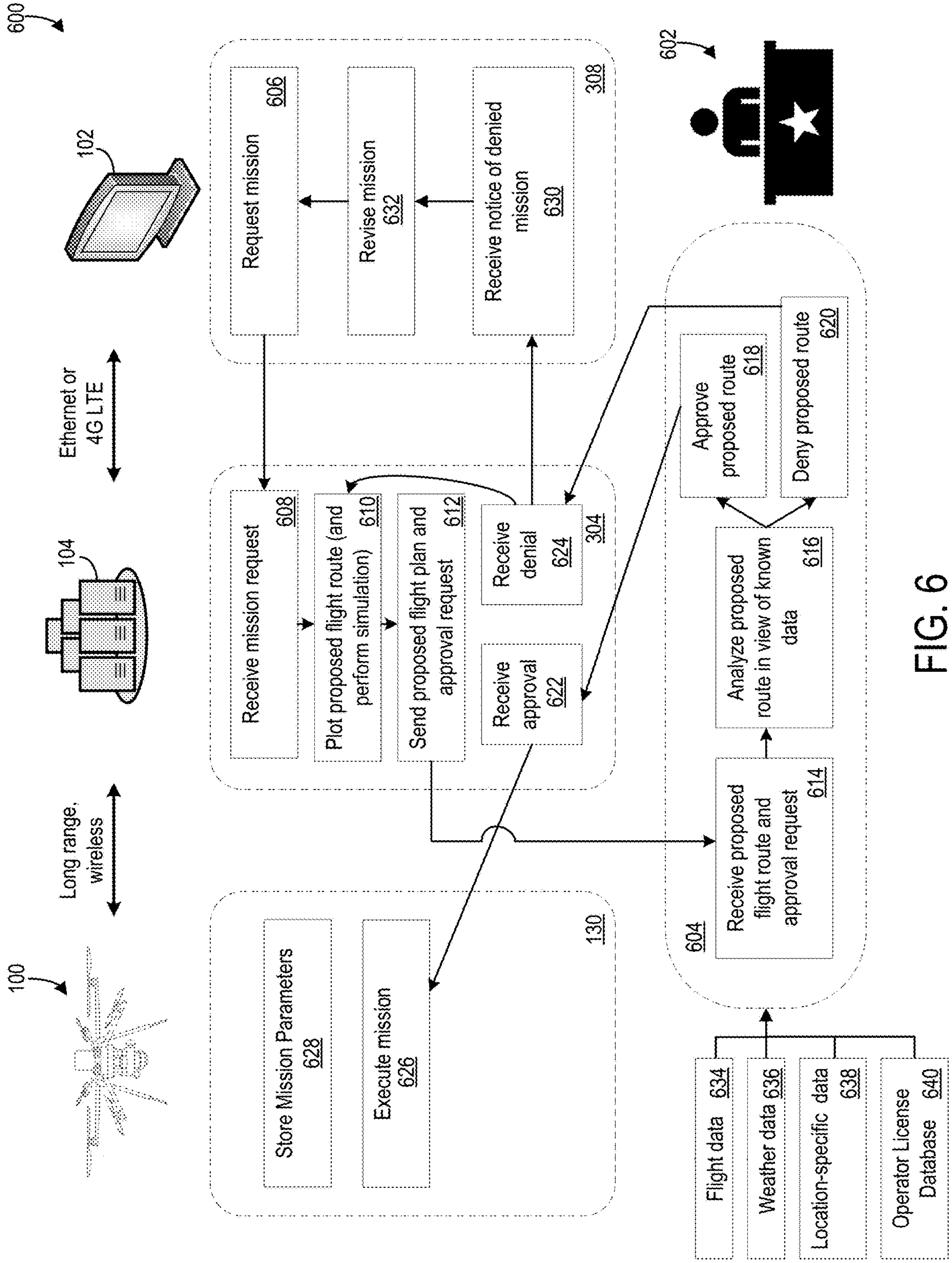
FIG. 6 is a flow chart showing a process for obtaining approval for a mission by an authority.

FIG. 6 is a flow chart showing a process 600 for obtaining approval for a mission by an authority 602. The management system 304 communicates with the client device 102, the UAV 100, and the authority system 604 to obtain mission approval. The operator requests (606) a mission at the client device 102 via interface 308. The mission request is received (608) by the management system 304, which plots (610) the proposed flight route (e.g., flight plan, path plan, etc.). The management system 304 sends (612) the proposed flight plan and an approval request to the authority system 604. As stated above, the approval request and flight plan data have all the information relevant to enable the authority 602 to approve the mission flight plan. In some implementations, the flight plan and approval request are formatted in a way specified by the authority 602. In some implementations, the flight plan and approval request are sent to a plurality of authority systems, in respective formats required by each of those systems. For example, if an authority requires a simulation of the flight be performed (or other flight plan validation), the management system 304 sends the simulation data proving that the simulation indicated that the mission plan is valid (or whatever data is requested by the authority 602).

The authority system 604 receives (614) the flight plan proposal and approval request. The authority system 604 analyzes (616) the flight plan proposal in light of any data the authority may have. For example, the authority may check the type of mission, type of unmanned vehicle 100, flight data 634, validation data, environmental conditions 638 and weather data 636, operator license 640, etc. to determine whether the mission should be approved. The authority 602 then either approves (618) or denies (620) the mission request and proposed flight plan.

If the management system 304 receives (622) the approval, the management system sends commands 108 to the unmanned vehicle 100 to execute (626) the mission. The UAV stores (628) the mission parameters of the flight plan and executes the mission. If the management system 304 receives (624) a denial of the mission request and flight plan, the management system sends a notice of denial to the client device 102. The operator receives (630) the notice of denial by the interface 308 and can revise (632) the mission manually before requesting an updated mission. Alternatively or in combination, the management system 304 revises the proposed flight route (e.g., if the reason for denial was given by the authority 602 and can be corrected automatically). In some implementations, the management system 304 may revise the flight plan automatically and suggest the update for confirmation by the operator before sending a revised flight plan and approval request to the authority system 604.

In some implementations, the authority 602 can include an external agency like the FAA, Coast Guard, a local town, etc. In some implementations, the authority may be internal to the management system 304 (e.g., an internal licensing system, etc.). If the authority 602 is internal to the management system 304, the authority 602 gathers data from external agencies (regulations, no fly zones, time constraints, commercial flight data, etc.) and compiles that data. The authority 602 can compare proposed flight plans against data from agencies and give provisional (or actual) agency approval. The agency regulations and data can be updated in real time. In some implementations, the external agencies may give authority to the management system 304 to provide authorization for approval of unmanned vehicle mission plans.

Figure 7A:
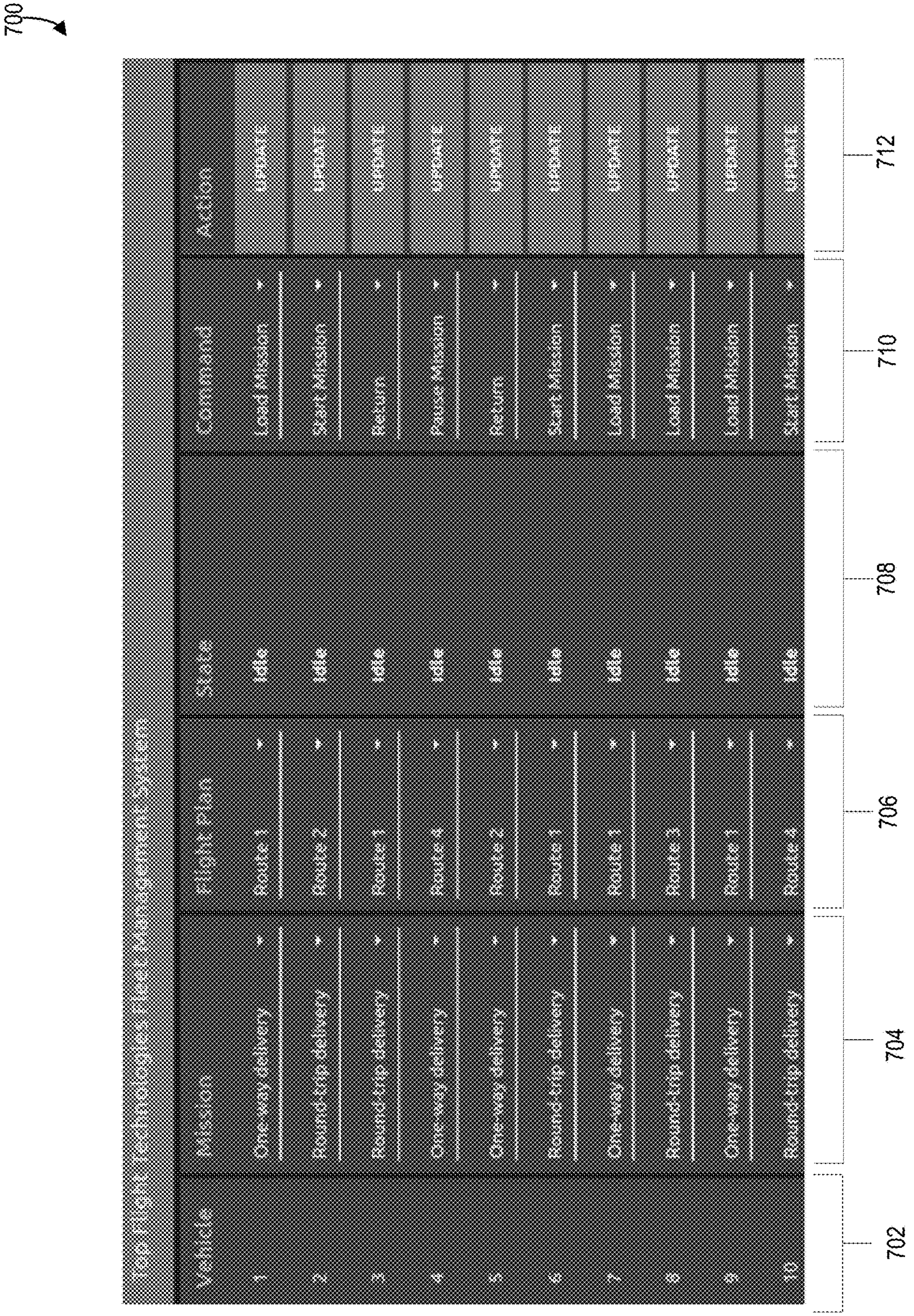
FIGS. 7A-7B depict screen shots of a fleet management user interface.

FIG. 7A shows an example of a screen shot of a fleet management user interface 700. The user interface 700 can be a part of interface 308. In some implementations, the interface 700 is useful for controlling multiple drones/stored missions simultaneously. The interface 700 allows a single (potentially lower-skill) operator to control multiple missions on multiple drones. The multiple vehicles appear on screen in column 702. Mission type and route can be selected from limited options (corresponding to pre-approved and stored flight plans).

A list of missions is shown in column 704. Here, the mission types include "one-way delivery" and "round-trip delivery," but other missions can be defined. A mission plan can be selected by the operator from a list for each vehicle. Column 706 shows route 1, route 2, route 3, and route 4 as possibilities (which may correspond to paths 716, 718, 720, and 722 in FIG. 7B, respectively). A status of each vehicle is shown in column 708. In some implementations, the mission plans for each vehicle can be selected automatically by the management system 304. For example, the automatic selection can be based on one or more criteria such as fuel usage, time for completion, etc.

In some implementations, commands 108 (e.g. load mission, start mission, return, emergency land, etc.) can be toggled, as shown in column 710. Action buttons, shown in column 712, can be selected by a user to cause the management system 304 to send an execute command to the selected unmanned vehicle 100. The commands 108 can be coarse because the details of flight plan have already been determined and approved, allowing for easy operation of multiple missions simultaneously. Thus, simple operation of many unmanned vehicles and unmanned vehicle missions can be performed simultaneously by an operator.

In some implementations, data reports can be aggregated for the entire fleet. Different data permissions, such as accessing and/or controlling vehicles, can be given to different operators. In some implementations, operators such as regulatory agencies can override commands from individual operators.

The interface 700 allows one operator to remotely manage multiple unmanned vehicles simultaneously from a remote location providing the capability to operate the fleet with fewer operators and reducing the cost of training and operation. The interface 700 allows fleet managers (operators) to easily develop verified and validated missions and flight routes with an emphasis on safety, reliability, accuracy, and repeatability. The interface 700 allows for post-flight review of data from high-level mission objectives to detailed subsystem analysis and maintains historical records for the entire fleet. The interface 700 provides a configurable dashboard interface for fleet wide statistics and operational oversight.

Figure 7B:
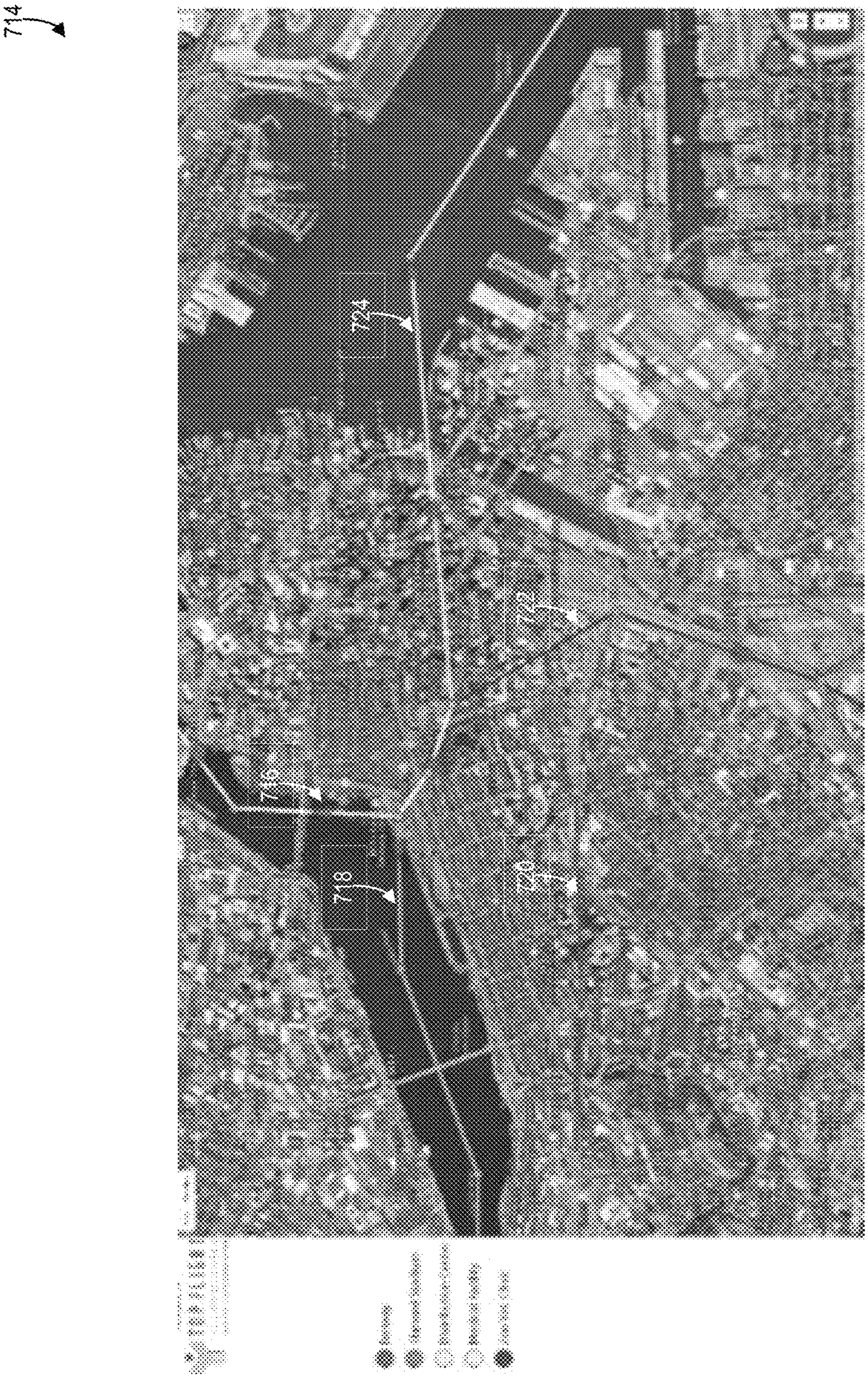

FIG. 7B shows an interface 714 showing planned paths for five UAV missions simultaneously. Interface 714 can correspond to the vehicles shown in FIG. 7A. FIG. 7B shows flight paths 716, 718, 720, 722, and 724.

Figure 8:
FIG. 8 depicts an example screen shot of the user interface of the customer portal.

FIG. 8 depicts an example screen shot 800 of the interface 308 of FIG. 3 during flight operations of the unmanned vehicle 100 (e.g., UAV 180). The screenshot 800 details a flight plan of the UAV 180. The screenshot 800 can be what the operator can see during UAV 180 operations. The screenshot 800 includes display of telemetry 802 (e.g., corresponding to telemetry 106 of FIG. 1A). The screenshot 800 includes a pose indicator 810 that shows a graphical representation of the pitch, roll, and (local) yaw of the UAV 180. The screenshot 800 shows a heading representation 812 showing the global direction that the UAV 180 is pointed. Other telemetry can be displayed in the interface 308. For example, an altitude meter 804, a ground speed meter 806, and a flight time clock 808 are shown. Other parameters can be selectively transmitted to operator for display in the interface 308. For example, the interface 308 can show camera images, GPS coordinates, and other parameter values. In some implementations, the interface 308 can be configured to show all or a portion of the status data 178. The accessibility of the status data 178 and the navigational data 176 can depend on a security level of the data.

The screenshot 800 shows a flight plan of the unmanned vehicle 100 (e.g., UAV 180). The flight plan shows a path 818 taken by the UAV 180 between various waypoints (e.g., GPS waypoints). The flight plan shows a position 830 of the UAV 180 in the local and/or global environment. The position 830 is shown in the form an arrow, in which the heading of the UAV 180 corresponds to the direction of the arrow. The next waypoint 832 is highlighted on the flight plan. Other waypoints are shown, such as waypoint 816. The planned path 814 connects the waypoints into a planned path through an environment. According to FIG. 8, the UAV 180 is still operating in accordance with the flight plan, as the position 830 of the UAV 180 is on the planned path between the waypoints.

Figure 9:
FIG. 9 depicts an example screen shot of the simulation environment.

FIG. 9 shows an example screenshot 900 of a simulation environment (e.g., simulation environment 306 of FIG. 3). The simulation includes actual hardware, software, controllers, and other avionics systems used on unmanned vehicles 100. Physics-based models account for as-built physical and aerodynamic properties of flight vehicles. Models of real world locations account for infrastructure, terrain, and dynamic weather conditions. Simulated flight test data is generated from each simulated mission. Physics-based simulation is combined with photo-realistic environments, which gives pilots and operators better experience, leading to faster attainment of proficiency. The simulation environment 306 allows industry designers to iterate on drone design, and further allows flight planners to test missions. As previously described, the simulation environment 306 can also be used for assessing the skillsets of pilots and operators to grant licenses and/or certifications (e.g., using a digital or virtual process). These licenses and/or certifications can authorize the pilots and operators to operate particular UAVs, access certain types of data, and/or execute missions having particular characteristics (e.g., weather conditions, geographic locations, time of day, number and type of UAVs involved, etc.).

A number of embodiments have been described. Nevertheless, it will be understood that various modifications may be made without departing from the spirit and scope of the subject matter described herein. Other such embodiments are within the scope of the following claims.

What is claimed is:

1. A system for managing missions for unmanned vehicles, the system comprising:

a computing interface configured to communicate with an unmanned aerial vehicle (UAV) and a client device;

a flight management system in communication with the computing interface, the flight management system comprising one or more processors coupled to a memory, the flight management system configured to:

receive parameters for a mission through the computing interface from the client device, the parameters being indicative of at least one action to be completed by the UAV during a flight of the UAV and one or more operational features of the UAV, the one or more operational features being a resource available to the UAV or a functional capability of the UAV for completing the at least one action;

generate a flight plan for the UAV, the flight plan comprising instructions for completing the at least one action by the UAV in accordance with the one or more operational features of the UAV;

a simulation environment configured to:

simulate execution of the generated flight plan based on the one or more operational features of the UAV;

assess, based on the simulated execution, a capability of a user to manage execution of the generated flight plan; and assign a permission level to the user based on the assessment, wherein the permission level controls access to one or more features of the UAV during execution of the mission;

wherein the flight management system is configured to:

initiate the execution of the mission in accordance with the flight plan and the simulated execution of the flight plan; and interface with the client device during execution of the mission to enable the user to control the mission via the flight management system according to the assigned permission level.

2. The system of claim 1, wherein the flight management system is further configured to:

configure the flight plan into a format specified by an external authority for validation by the external authority;

transmit the flight plan in the format to the external authority; and receive a validation of the flight plan from the external authority, the validation indicative of approval to execute the flight plan.

3. The system of claim 1, further comprising a data store configured to store data representing equipment that can be added to the UAV for completing the at least one action, and wherein the computing interface is configured to enable selection of the equipment for including with the UAV, and wherein at least some of the parameters for the mission that are indicative of the one or more operational features are updated based on the selection of the equipment.

4. The system of claim 1, further comprising a simulation environment configured to:

receive the flight plan from the flight management system;

simulate the execution of the generated flight plan by the UAV based on the one or more operational features of the UAV; and verify, based on the simulating, that the UAV is capable of completing the flight plan.

5. The system of claim 1, wherein the one or more operational features comprise at least one of a payload size for transporting by the UAV, an altitude limitation of the UAV, a speed limitation of the UAV, and an operational distance of the UAV.

6. The system of claim 1, wherein the one or more operational features represent a specification of hardware sensors supported by the UAV.

7. The system of claim 1, wherein the computing interface is configured to provide a security layer for accessing telemetry of the UAV, the security layer comprising at least one permission level for accessing the telemetry.

8. The system of claim 1, wherein the computing interface is configured to receive telemetry from the UAV and send the telemetry to the client device for presentation on a user interface.

9. The system of claim 1, further comprising an operator database, wherein the flight plan comprises a specification of at least one operator from the operator database for monitoring the UAV during the flight of the UAV.

10. The system of claim 9, wherein the computing interface is configured to grant a permission to a device of the at least one operator to operate the UAV during the flight of the UAV.

11. The system of claim 10, wherein the permission level is granted to the device of the at least one operator based on a certification and/or license associated with the at least one operator.

12. The system of claim 11, wherein the certification and/or license associated with the at least one operator is obtained through an assessment of the at least one operator using a simulated environment.

13. The system of claim 1, wherein the flight management system is further configured to generate the flight plan for the UAV based on a consideration of capabilities, characteristics, and/or locations of at least one other UAV configured to communicate with the computing interface.

14. A method for managing missions for unmanned vehicles, the method comprising:

receiving, at a flight management system and through a computing interface in communication with a client device, parameters for a mission that are indicative of at least one action to be completed by an unmanned aerial vehicle (UAV) during a flight of the UAV and one or more operational features of the UAV, the one or more operational features being a resource available to the UAV or a functional capability of the UAV for completing the at least one action;

generating, at the flight management system, a flight plan for the UAV, the flight plan comprising instructions for completing the at least one action by the UAV in accordance with the one or more operational features of the UAV;

simulating, at a simulation environment, execution of the generated flight plan based on the one or more operational features of the UAV;

assessing, at the simulation environment and based on the simulated execution, a capability of a user to manage execution of the generated flight plan; and assigning, at the simulation environment, a permission level to the user based on the assessment, wherein the permission level controls access to one or more features of the UAV during execution of the mission;

initiating, at the flight management system, the execution of the mission in accordance with the flight plan and the simulated execution of the flight plan; and interfacing, at the flight management system, with the client device during execution of the mission to enable the user to control the mission via the flight management system according to the assigned permission level.

15. The method of claim 14, further comprising:

configuring the flight plan into a format specified by an external authority for validation by the external authority;

transmitting the flight plan in the format to the external authority; and receiving a validation of the flight plan from the external authority, the validation indicative of approval to execute the flight plan.

16. The method of claim 14, further comprising:

storing, at a data store, data representing equipment that can be added to the UAV for completing the at least one action;

enabling selection of the equipment for including with the UAV via the computing interface; and updating, based on the selection of the equipment, at least some of the parameters for the mission that are indicative of the one or more operational features.

17. The method of claim 14, further comprising:

receiving, at the simulation environment, the flight plan from the flight management system;

simulating the execution of the generated flight plan by the UAV based on the one or more operational features of the UAV; and verifying, based on the simulating, that the UAV is capable of completing the flight plan.

18. The method of claim 14, wherein the one or more operational features comprise at least one of a payload size for transporting by the UAV, an altitude limitation of the UAV, a speed limitation of the UAV, and an operational distance of the UAV.

19. The method of claim 14, wherein the one or more operational features represent a specification of hardware sensors supported by the UAV.

20. The method of claim 14, further comprising providing an operator of the UAV selective access to telemetry of the UAV, wherein the selective access is based on a security layer provided by the computing interface.

21. The method of claim 14, further comprising receiving, at the computing interface, telemetry from the UAV and sending the telemetry to the client device for presentation on a user interface.

22. The method of claim 14, wherein generating the flight plan for the UAV comprises generating the flight plan to include a specification of at least one operator from an operator database for monitoring the UAV during the flight of the UAV.

23. The method of claim 22, further comprising granting permission, via the computing interface, to a device of the at least one operator to operate the UAV during the flight of the UAV.

24. The method of claim 23, wherein granting the permission level to the device of the at least one operator is based on a certification and/or license associated with the operator.

25. The method of claim 24, wherein the certification and/or license associated with the at least one operator is obtained through an assessment of the at least one operator using a simulated environment.

26. The method of claim 14, wherein generating the flight plan for the UAV comprises generating the flight plan based on a consideration of capabilities, characteristics, and/or locations of at least one other UAV configured to communicate with the computing interface.

27. A non-transitory computer readable medium storing instructions that are executable by a processing device, and upon such execution cause the processing device to perform operations comprising:

receiving, at a flight management system and through a computing interface in communication with a client device, parameters for a mission that are indicative of at least one action to be completed by an unmanned aerial vehicle (UAV) during a flight of the UAV and one or more operational features of the UAV, the one or more operational features being a resource available to the UAV or a functional capability of the UAV for completing the at least one action;

generating, at the flight management system, a flight plan for the UAV, the flight plan comprising instructions for completing the at least one action by the UAV in accordance with the one or more operational features of the UAV;

simulating, at a simulation environment, execution of the generated flight plan based on the one or more operational features of the UAV;

assessing, at the simulation environment and based on the simulated execution, a capability of a user to manage execution of the generated flight plan; and assigning, at the simulation environment, a permission level to the user based on the assessment, wherein the permission level controls access to one or more features of the UAV during execution of the mission;

initiating, at the flight management system, the execution of the mission in accordance with the flight plan and the simulated execution of the flight plan; and interfacing, at the flight management system, with the client device during execution of the mission to enable the user to control the mission via the flight management system according to the assigned permission level.

28. The non-transitory computer readable medium of claim 27, wherein the operations further comprise:

configuring the flight plan into a format specified by an external authority for validation by the external authority;

transmitting the flight plan in the format to the external authority; and receiving a validation of the flight plan from the external authority, the validation indicative of approval to execute the flight plan.

29. The non-transitory computer readable medium of claim 27, wherein the operations further comprise:

storing, at a data store, data representing equipment that can be added to the UAV for completing the at least one action;

enabling selection of the equipment for including with the UAV via the computing interface; and updating, based on the selection of the equipment, at least some of the parameters for the mission that are indicative of the one or more operational features.

30. The non-transitory computer readable medium of claim 27, wherein the operations further comprise:

receiving, at a simulation environment, the flight plan from the flight management system;

simulating execution of the generated flight plan by the UAV based on the one or more operational features of the UAV; and verifying, based on the simulating, that the UAV is capable of completing the flight plan.

31. The non-transitory computer readable medium of claim 27, wherein the one or more operational features comprise at least one of a payload size for transporting by the UAV, an altitude limitation of the UAV, a speed limitation of the UAV, and an operational distance of the UAV.

32. The non-transitory computer readable medium of claim 27, wherein the one or more operational features represent a specification of hardware sensors supported by the UAV.

33. The non-transitory computer readable medium of claim 27, wherein the operations further comprise providing an operator of the UAV selective access to telemetry of the UAV, wherein the selective access is based on a security layer provided by the computing interface.

34. The non-transitory computer readable medium of claim 27, wherein the operations further comprise receiving, at the computing interface, telemetry from the UAV and sending the telemetry to the client device for presentation on a user interface.

35. The non-transitory computer readable medium of claim 27, wherein generating the flight plan for the UAV comprises generating the flight plan to include a specification of at least one operator from an operator database for monitoring the UAV during the flight of the UAV.

36. The non-transitory computer readable medium of claim 35, wherein the operations further comprise granting permission, via the computing interface, to a device of the at least one operator to operate the UAV during the flight of the UAV.

37. The non-transitory computer readable medium of claim 36, wherein granting the permission level to the device of the at least one operator is based on a certification and/or license associated with the operator.

38. The non-transitory computer readable medium of claim 37, wherein the certification and/or license associated with the at least one operator is obtained through an assessment of the at least one operator using a simulated environment.

39. The non-transitory computer readable medium of claim 27, wherein generating the flight plan for the UAV comprises generating the flight plan based on a consideration of capabilities, characteristics, and/or locations of at least one other UAV configured to communicate with the computing interface.

* * * * *